US008749799B2

(12) United States Patent
Okuno et al.

(10) Patent No.: US 8,749,799 B2
(45) Date of Patent: Jun. 10, 2014

(54) IMAGE CARRIER AND IMAGE FORMING APPARATUS THEREWITH

(75) Inventors: Tatsuo Okuno, Kanagawa (JP); Yoshifumi Ozaki, Kanagawa (JP); Akemi Murakami, Kanagawa (JP); Akihiko Noda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 779 days.

(21) Appl. No.: 13/032,116

(22) Filed: Feb. 22, 2011

(65) Prior Publication Data

US 2012/0062684 A1 Mar. 15, 2012

(30) Foreign Application Priority Data

Sep. 9, 2010 (JP) ................................ 2010-202084

(51) Int. Cl.
*G06F 3/12* (2006.01)

(52) U.S. Cl.
USPC ............................ 358/1.1; 347/141; 358/300

(58) Field of Classification Search
None
See application file for complete search history.

(56) References Cited

U.S. PATENT DOCUMENTS

| | | | | |
|---|---|---|---|---|
| 4,748,464 | A * | 5/1988 | Pannekoek et al. | 347/141 |
| 5,640,189 | A * | 6/1997 | Ohno et al. | 347/141 |
| 6,100,909 | A * | 8/2000 | Haas et al. | 347/141 |
| 6,760,051 | B2 | 7/2004 | Fujii et al. | |
| 7,133,055 | B2 * | 11/2006 | Vaidyanathan et al. | 347/111 |
| 7,154,452 | B2 * | 12/2006 | Nakamura et al. | 345/1.1 |
| 7,388,594 | B2 | 6/2008 | Kim et al. | |
| 8,162,471 | B2 * | 4/2012 | Shin et al. | 347/103 |
| 8,643,685 | B2 * | 2/2014 | McGuire et al. | 347/141 |

FOREIGN PATENT DOCUMENTS

| | | |
|---|---|---|
| JP | B2-3233463 | 9/2001 |
| JP | A-2003-32440 | 1/2003 |
| JP | A-2004-219635 | 8/2004 |
| JP | A-2005-331955 | 12/2005 |
| JP | B2-3826013 | 7/2006 |

* cited by examiner

*Primary Examiner* — David S Cammick
(74) *Attorney, Agent, or Firm* — Oliff PLC

(57) ABSTRACT

An image carrier includes: a support that circulatively rotates, a plurality of pixel electrodes; a plurality of switches that are placed like a matrix on the support in a one-to-one correspondence with the pixel electrodes; a plurality of scan signal lines that are provided on the support so as to extend along the rotation axis direction of the support for transmitting a scan signal for selecting; a plurality of latent image forming signal lines; a plurality of signal leads that are provided on the support so as to extend in the rotation axis direction of the support; a scan signal supply device that are provided in an end part other than the pixel electrode placement area; and a latent image forming signal supply device that are provided in an end part other than the pixel electrode placement area.

12 Claims, 18 Drawing Sheets

FIG. 4A
FIG. 4B
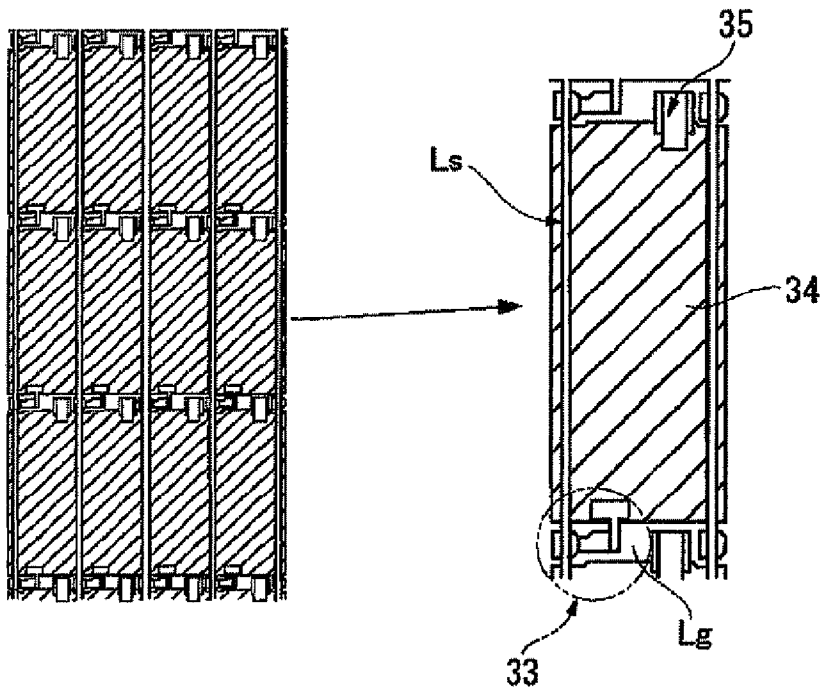
FIG. 4C
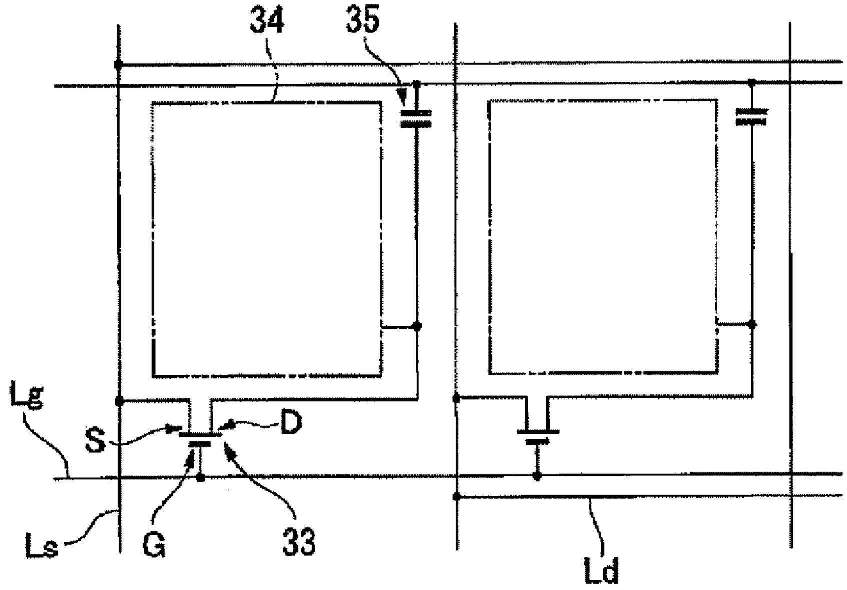

IMAGE CARRIER AND IMAGE FORMING APPARATUS THEREWITH

CROSS-REFERENCE TO RELATED APPLICATION

This application is based on and claims priority under 35 USC 119 from Japanese Patent Application No. 2010-202084 filed on Sep. 9, 2010.

BACKGROUND

1. Technical Field

This invention relates to an image carrier and an image forming apparatus using the image support.

2. Related Art

Generally, electrophotography is used as an image forming system used with an image forming apparatus of a copier, a printer, etc. A laser or an LED array is used to apply an optical image to a photoconductive body charged by a corona discharger or a charger of a charging roll, etc., whereby an electrostatic latent image is formed and is developed using charged toner to visualize an image.

SUMMARY

According to an aspect of the invention, an image carrier includes:

a support that circulatively rotates, a plurality of pixel electrodes that are provided on the support and placed like a matrix for each pixel unit along a rotation direction and a rotation axis direction of the support so as to form a latent image based on an image signal;

a plurality of switches that are placed like a matrix on the support in a one-to-one correspondence with the pixel electrodes for switching a supply timing of a latent image forming signal so as to form a latent image based on the image signal for the pixel electrodes;

a plurality of scan signal lines that are provided on the support so as to extend along the rotation axis direction of the support for transmitting a scan signal for selecting and scanning in sequence the supply timing of the latent image forming signal to a group of the plurality of switches corresponding to the pixel electrodes arranged in a row along the rotation axis direction of the support;

a plurality of latent image forming signal lines that are provided on the support so as to extend in the rotation direction of the support for transmitting the latent image forming signal to a group of the plurality of switches corresponding to the pixel electrodes arranged in a row along the rotation direction of the support;

a plurality of signal leads that are provided on the support so as to extend in the rotation axis direction of the support and connected to the latent image forming signal lines for drawing out the latent image forming signal line toward an end part other than a pixel electrode placement area in the rotation axis direction on the support;

a scan signal supply device that are provided in an end part other than the pixel electrode placement area in the rotation axis direction on the support or any other part passing through the end part and connected to the plurality of scan signal lines arranged in the rotation direction of the support for supplying a scan signal to each scan signal line; and a latent image forming signal supply device that are provided in an end part other than the pixel electrode placement area in the rotation axis direction on the support or any other part passing through the end part and connected to the plurality of signal leads arranged in the rotation direction of the support for supplying the latent image forming signal to each signal lead.

BRIEF DESCRIPTION OF THE DRAWINGS

Embodiments of the invention will be described in detail based on the following figures, wherein:

In the accompanying drawings:

FIG. 1A is a perspective view of the image carrier and FIG. 1B shows the peripheral configuration of pixel electrodes;

FIG. 4A is a schematic representation to show an arrangement example of pixel electrodes of the image carrier used in exemplary embodiment 1 of the invention; FIG. 4B is a schematic representation to show one of the pixel electrodes; and FIG. 4C is a schematic representation to show a wiring example to the pixel electrodes;

DETAILED DESCRIPTION

Summary of Embodiment

Figure 1A:
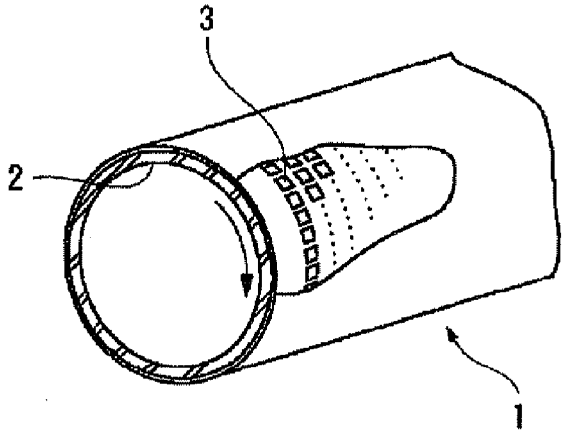
FIGS. 1A and 1B are schematic representations to show a summary of an exemplary embodiment of an image carrier incorporating the invention.
Figure 1B:
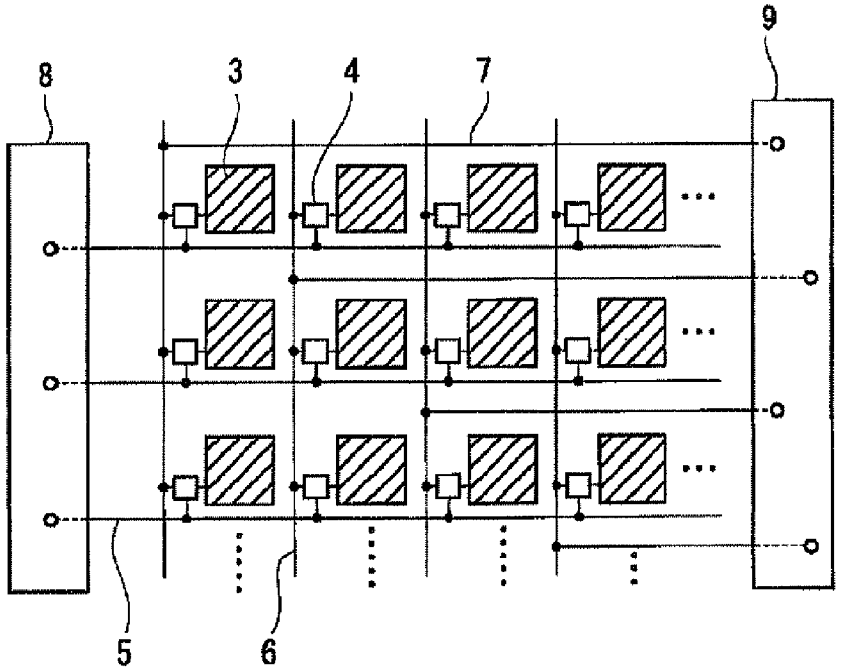

FIG. 1A is a schematic representation to show a summary of an exemplary embodiment of an image carrier incorporating the invention and FIG. 1B shows the configuration of wiring for transmitting a signal to a pixel electrode 3 in an image carrier 1.

In FIGS. 1A and 1B, the image carrier 1 includes a support 2 that may circulatively rotate, plural of pixel electrodes 3 provided on the support 2 and placed like a matrix for each pixel unit along a rotation direction and a rotation axis direction of the support 2 for forming a latent image based on an image signal, switches 4 placed like a matrix on the support 2 in a one-to-one correspondence with the pixel electrodes 3 for switching a supply timing of a latent image forming signal for forming a latent image based on the image signal for the pixel electrodes 3, plural of scan signal lines 5 provided on the support 2 so as to extend along the rotation axis direction of the support 2 for transmitting a scan signal for selecting and scanning in sequence the supply timing of the latent image forming signal to a group of the switches 4 corresponding to the pixel electrodes 3 arranged in a row along the rotation axis direction of the support 2, plural of latent image forming signal lines 6 provided on the support 2 so as to extend in the rotation direction of the support 2 for transmitting the latent image forming signal to a group of the switches 4 corresponding to the pixel electrodes 3 arranged in a row along the rotation direction of the support 2, plural of signal leads 7 provided on the support 2 so as to extend in the rotation axis direction of the support 2 and connected to the latent image forming signals for drawing out the latent image forming signal line toward an end part other than a pixel electrode placement area in the rotation axis direction on the support 2, a scan signal supply device 8 provided in an end part other than the pixel electrode placement area in the rotation axis direction on the support 2 or any other part passing through the end part and connected to the plurality of scan signal lines 5 arranged in the rotation direction of the support 2 for supplying a scan signal to each scan signal line 5, and a latent image forming signal supply device 9 provided in an end part other than the pixel electrode placement area in the rotation axis direction on the support 2 or any other part passing through the end part and connected to the plurality of signal leads 7 arranged in the rotation direction of the support 2 for supplying the latent image forming signal to each signal lead 7.

The image signal means a signal of image data corresponding to each pixel in the image carrier 1. The latent image forming signal means a voltage signal for causing the switches 4 to form a latent image in the pixel electrodes 3. Further, the scan signal means a signal for temporarily turning on the switches 4 arranged for each scan signal line 5 and the switches are switched in sequence for each scan signal line 5 or at random. Further, the end part other than the pixel electrode placement area or any other part passing through the end part means an end part except the portion where the pixel electrodes 3 are arranged like a matrix in the direction along the rotation axis of the support 2 or any other part passing through the end part and may be one end part or both end parts along the rotation axis of the support 2 or a part except a surface part of the support 2 passing through the end parts, for example, a side or inside of the support 2.

The support may be of a rotatable ring-shaped structure and may be shaped like a drum, a belt, etc.; however, to simplify the structure, a drum may be used.

Further, the pixel electrodes 3 may be placed like a matrix in the rotation direction and the rotation axis direction of the support 2 and the placement density corresponds to the density of pixels that may be formed. The number of rotation axes of the support 2 is not limited to one; for example, when the support 2 is shaped like a belt, the support 2 may have plural of rotation axes.

As the switch 4, representatively a thin-film transistor (TFT) may be named, but any other element may be used if it may switch the supply timing of the latent image forming signal applied to the pixel electrode 3.

Further, the switches 4 are provided in a one-to-one correspondence with the pixel electrodes 3 and thus are also placed like a matrix.

In the invention, the scan signal lines 5 and the latent image forming signal lines 6 are placed crossing each other; the scan signal lines 5 and the signal leads 7 are placed in the same direction. Thus, the scan signal supply device 8 to which the scan signal lines 5 are connected and the latent image forming signal supply device 9 to which the signal leads 7 are connected are placed each in an end part along the rotation axis direction of the support 2 or any other part passing through the end part. To select and scan in sequence the supply timing of the latent image forming signal by the scan signal on the scan signal lines 5, for example, continuous scan may be performed between the adjacent scan signal lines 5 or may be performed in a predetermined order without being continuous between the adjacent scan signal lines 5.

In the summary of the invention, no latent image forming signal supply device 9 may be provided over a peripheral length direction on the support 2. Thus, the pixel electrodes may be provided over all area in the peripheral length direction of the support 2 from the viewpoint of making larger an image of a length that may be formed as an image carrier 1.

From the viewpoint of facilitating implementation of the scan signal supply device 8 and the latent image forming signal supply device 9 onto the support 2, the scan signal supply device 8 may be provided in one end part other than the pixel electrode placement area in the rotation axis direction on the support 2 or any other part passing through the end part and the latent image forming signal supply device 9 is provided in an opposite end part other than the pixel electrode placement area in the rotation axis direction on the support 2 or any other part passing through the end part. In the mode, plural of scan signal supply devices 8 and plural of latent image forming signal supply devices 9 may be placed relative to the rotation axis direction of the support 2.

Further, in the mode, as for the connection points of the signal leads 7 and the latent image forming signal supply device 9, separate connection may be made at different positions relative to the rotation axis direction of the support 2 so that at least the adjacent connection points do not become the same position relative to the rotation axis position and the rotation direction of the support 2.

Zigzag placement may be used as a representative form when the connection parts to the latent image forming signal supply device 9 are different positions in the rotation axis direction and the rotation direction of the support 2. The zigzag placement indicates zigzag placement of the connection parts of the signal leads 7 and the latent image forming signal supply device 9; in the end part of the support 2 in the rotation axis direction thereof, one of the adjacent signal leads 7 is connected to the latent image forming signal supply device 9 at an inner position and the other is connected at an outer position. When such zigzag placement is adopted, plural of latent image forming signal supply devices 9 may be placed along the rotation axis position of the support 2 and the signal leads 7 may be connected to the different latent image forming signal supply devices 9 or may be connected separately in one latent image forming signal supply device 9. That is, the zigzag placement means connection to the same latent image forming signal supply device 9 or plural of latent image forming signal supply devices 9 at two different positions in the direction along the rotation axis direction of the support 2. The number of separate positions in the rotation axis direction of the support 2 and may exceed two.

Further, as for the connection points of plural of scan signal lines and the scan signal supply device 8, separate connection may be made at different positions relative to the rotation axis direction of the support 2 so that at least the adjacent connection points do not become the same position relative to the rotation axis direction and the rotation direction of the support 2. In this case, connection may be made as with the latent image forming signal supply device 9.

From the viewpoint of facilitating external wiring to the scan signal supply device 8 and the latent image forming signal supply device 9, the scan signal supply device 8 and the latent image forming signal supply device 9 may be provided in one end part other than the pixel electrode placement area in the rotation axis direction on the support 2 or in any other part passing through the end part.

From the viewpoint of still more facilitating implementation of the scan signal supply device 8 and the latent image forming signal supply device 9, the scan signal supply device 8 and the latent image forming signal supply device 9 may have an overlap portion in the rotation direction of the support 2 and are provided side by side in the rotation axis direction and either the scan signal lines 5 or the signal leads 7 stride in an isolation state over the inner provided supply device of the scan signal supply device 8 or the latent image forming signal supply device 9 and are connected to the outer corresponding supply device.

From the viewpoint of facilitating implementation of the supply devices and facilitating wiring, the scan signal lines 5 and the signal leads 7 may deviate relative to the rotation direction of the support 2.

From the viewpoint of decreasing the effect on a latent image from the latent image forming signal lines 6 and the signal leads 7 in the image carrier 1, a shield member for preventing at least a part of an electric field from the latent image forming signal lines 6 and the signal leads 7 placed close to the pixel electrodes 3 from affecting an electric field caused by a latent image of the pixel electrodes 3 may be provided. Such a shield member may be able to shield the effect from a latent image forming signal transmitted to the latent image forming signal lines 6 and the signal leads 7, for example, and a thin layer made of a conductive material of metal, etc., is used as a representative. From the viewpoint of still more enhancing the effect of the shield member, the latent image forming signal lines 6 and the signal leads 7 positioned between the pixel electrodes 3 may be all covered with the shield member.

Usually, to transmit a latent image forming signal based on an image signal to the switch 4, for example, a signal shaped like a pulse wave is transmitted to the latent image forming signal lines 6 and the signal leads 7. Thus, to lighten the effect of the signal on the pixel electrodes 3, the shield member becomes effective.

On the other hand, a signal for scanning plural of scan signal lines 5 arranged in the rotation direction of the support 2 is transmitted to the scan signal lines 5; the signal is switched for each of the scan signal lines 5 and thus only a waveform shaped like a trigger is transmitted to one scan signal line 5 and the effect of an electric field from the scan signal lines 5 is slight as compared with the latent image forming signal lines 6 and the signal leads 7. However, from the viewpoint of decreasing the effect of the electric field from the scan signal lines 5, the shield member may prevent at least a part of the electric field from the scan signal lines 5 from affecting a latent image of the pixel electrodes 3.

From the viewpoint of more enhancing the shield effect in the shield member, the shield member may be electrically connected to the pixel electrode 3 nearest thereto. The electric connection means a connection state in which they are electrically short-circuited and may be placed in the same potential.

From the viewpoint of providing the pixel electrode 3 widely, the shield member may be placed at a deeper position than the pixel electrode 3 relative to a thickness direction of the pixel electrode 3 on the support 2. In the form, further when the pixel electrodes 3 are projected in the thickness direction, the shield member may have an overlap portion with some of the pixel electrodes 3. From the viewpoint of shielding the electric field action, the shield member may have an overlap portion with each of the adjacent pixel electrodes 3.

An image forming apparatus incorporating the image carrier 1 may be as follows:

The image forming apparatus includes the image carrier 1, latent image creation means for creating a latent image forming signal based on an image signal for the pixel electrodes 3 of the image carrier 1, and developing means for developing a latent image formed in the pixel electrodes 3 with the latent image forming signal created in the latent image creation means in a developer.

From the viewpoint of miniaturizing the image carrier 1 in the image forming apparatus, the image carrier may have a peripheral length less than the maximum size in which an image may be formed in a direction along the rotation direction of the image carrier 1. That is, it is made possible to set the maximum size in which an image may be formed to a length exceeding one revolution of the peripheral length of the image carrier 1 and accordingly the peripheral length of the image carrier 1 is suppressed to a short length. If an area where an image may not be formed (for example, a groove, etc.,) is provided in a part of the image carrier 1 in the peripheral length direction thereof, the maximum dimension in which an image may be formed becomes less than the peripheral length and to enlarge the maximum dimension, the image carrier 1 may be upsized.

The invention will be discussed below in detail based on embodiments shown in the accompanying drawings:

Embodiment 1

Figure 2:
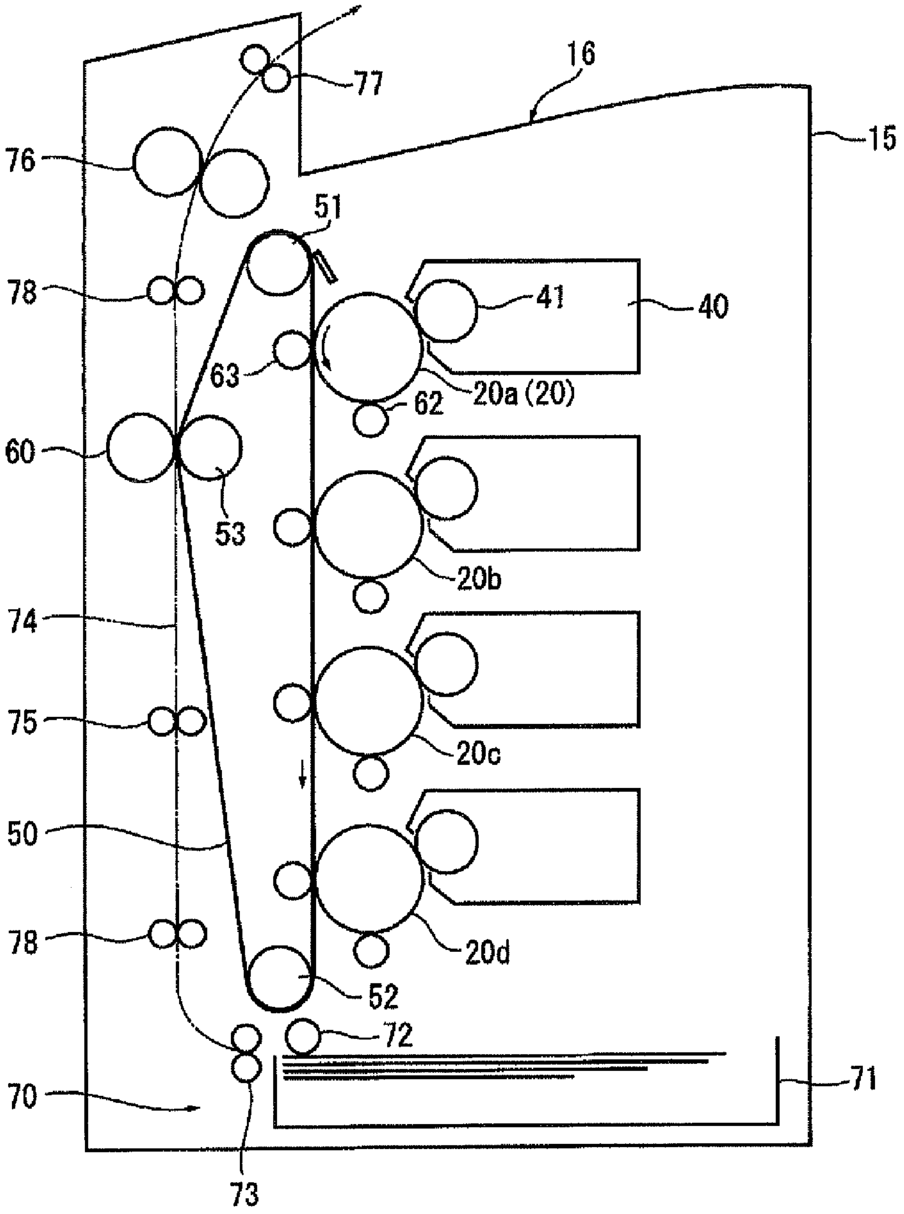
FIG. 2 is a schematic representation to show the general configuration of an image forming apparatus of exemplary embodiment 1 of the invention.

FIG. 2 shows exemplary embodiment 1 of an image forming apparatus incorporating the invention.

<General Configuration of Image Forming Apparatus>

In the figure, the image forming apparatus of the exemplary embodiment is a tandem color image forming apparatus. In an apparatus cabinet 15, image supports 20 (20*a* to 20*d*) where toner images of color components (yellow, magenta, cyan, black, etc.,) are formed in electrophotography, for example, are placed in parallel in a roughly vertical direction, an intermediate transfer belt 50 which circulatively rotates, opposed to the image carrier 20 is stretched in the roughly vertical direction, and the color toner images on the image supports 20 are multiplexed on the intermediate transfer belt 50.

In the embodiment, each of the image supports 20 is surrounded by a developing device 40 for developing an electrostatic latent image formed on the image carrier 20 in toner to form a visible image and a cleaner 62 for cleaning the remaining toner on the image carrier 20 and further a transfer device 63 for transferring the developed toner image on the image carrier 20 to the intermediate transfer belt 50 at a position opposed to the image carrier 20 across the intermediate transfer belt 50. Reference numeral 41 denotes a developing roll for supplying toner directly to the image carrier 20 in the developing device 40.

On the other hand, the intermediate transfer belt 50 is stretched on plural of stretch rolls 51 to 53 (in the example, three) and circulatively rotates with the stretch roll 51, for example, as a drive roll. A secondary transfer device 60 is provided at a position opposed to the stretch roll 53 across the intermediate transfer belt 50 and the multiple toner image multiplexed on the intermediate transfer belt 50 is collectively transferred onto a record material supplied from a record material supply device 70 described later. At this time, a predetermined secondary transfer bias is applied to a nip between the secondary transfer device 60 and the stretch roll 53 as an opposed roll thereto.

The record material supply device 70 for supplying a record material is provided at the bottom of the apparatus cabinet 15 and, for example, record materials stored in a supply vessel 71 are supplied toward a record material conveying passage 74 extending in the vertical direction one at a time by a pickup roll 72 and a separation mechanism 73.

The record material supplied from the record material supply device 70 to the record material conveying passage 74 is once registered at a registration roll 75 provided downward of the record material conveying passage 74 and is conveyed toward the downward secondary transfer device 60 at a predetermined timing. Then, the multiple toner image on the intermediate transfer belt 50 is collectively transferred onto the record material at a secondary transfer part of the secondary transfer device 60. The record material to which the toner image is collectively transferred is fixed in a fixing device 76 and then is discharged from a discharge roll 77 toward a record material receptacle 16 made of a part of the apparatus cabinet 15. A conveying member (for example, a conveying roll) 78 for conveying the record material and a conveying guide member, etc., not shown are provided as required in the record material conveying passage 74.

<Image Support>

Next, the image carrier 20 used in the exemplary embodiment will be discussed in detail.

Figure 3:
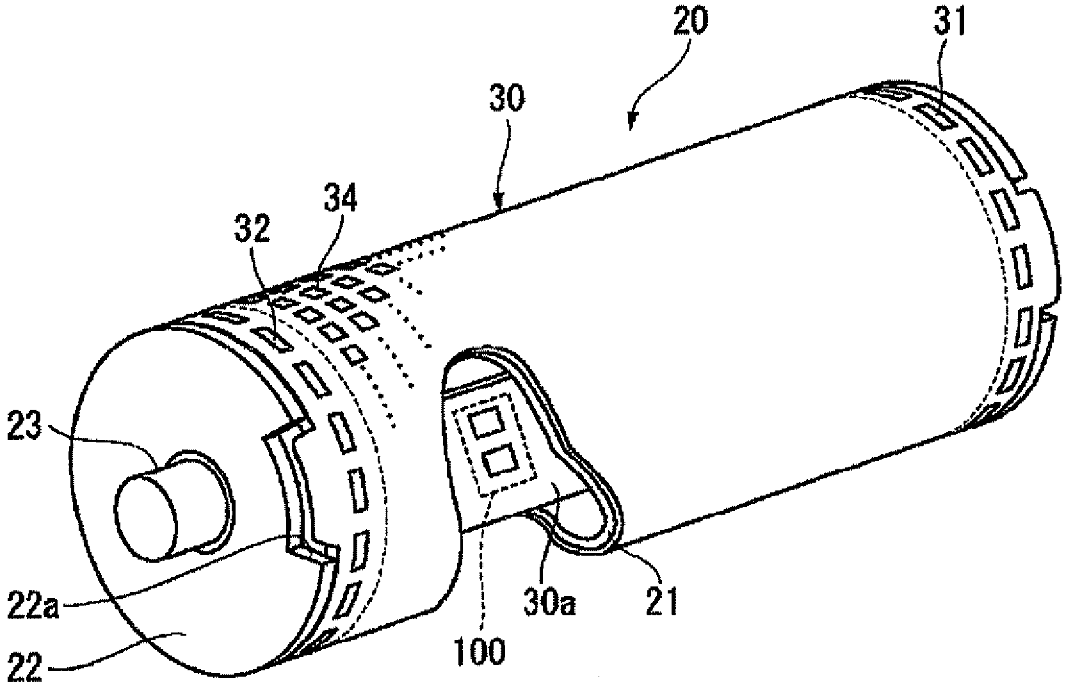
FIG. 3 is a perspective view to show an image carrier used in exemplary embodiment 1 of the invention.

In the image carrier 20 of the embodiment, a matrix panel 30 formed with a large number of pixel electrodes (described later) like a matrix on a film base material is wound around a rigid drum 21 of a support that may circulatively rotate along the circumferential direction of the rigid drum 21 and is fixedly supported with no gap in the joint part, as shown in FIG. 3.

As the matrix panel 30, a thin-film technology used in an IC manufacturing process, etc., is used to produce various elements for a heat-resistance polyimide resin film base material (not shown), for example, and further pixel electrodes 34 are placed like a matrix in pixel units.

The pixel electrodes 34 placed like a matrix is made up of data lines provided by arranging a large number of selection lines each with a pixel electrode group arranged in the rotation direction of the rigid drum 21, for example, in the rotation axis direction of the rigid drum 21 and scan lines provided by arranging a large number of selection lines each with a pixel electrode group arranged in the rotation axis direction of the rigid drum 21 in the rotation direction of the rigid drum 21.

Generally, to connect the data lines and the scan lines and drivers (corresponding to latent image forming signal supply device, scan signal supply device), the data lines and the scan lines are placed in a cross direction and thus it is assumed that a data driver (corresponding to latent image forming signal supply device) connected to the data line is provided in the peripheral length direction of the rigid drum 21, for example, and on the other hand, a scan driver (corresponding to scan signal supply device) connected to the scan lines is provided in the rotation direction of the rigid drum 21. However, in such a configuration, when the rigid drum 21 rotates, an area where the data driver is placed exists in a part along the peripheral length and thus an area where the pixel electrode 34 is not placed occurs. Thus, the maximum size in which an image may be formed becomes a portion except the area where the pixel electrode 34 is not placed, namely, a shorter size than the peripheral length of the rigid drum 21. If an attempt is made to enlarge the maximum size, the diameter of the rigid drum 21 would be made large.

If an attempt is made to lessen the diameter, it is assumed that a through hole conducting while piercing the rigid drum 21 is provided in a part corresponding to the data line and the data driver is provided on the inner side of the rigid drum 21. In this case, however, since the through hole needs to be provided in the part where the pixel electrode 34 is not placed, for example, to form a through hole of ϕ0.1 mm, the space between the adjacent pixel electrodes 34 needs to be made larger than the diameter of the through hole and the density of the pixel electrodes 34 lowers. Further, forming of such a minute through hole needs a complicated process.

The matrix panel 30 of the exemplary embodiment is formed with an appropriate number of data drivers 31 corresponding to the latent image forming signal supply device and an appropriate number of scan drivers 32 corresponding to the scan signal supply device on different end sides in the rotation axis direction of the rigid drum 21, as shown in FIG. 3. Thus, the data drivers 31 are not placed in the area where an image may be formed (area in the dotted lines in the figure corresponding to the area where the pixel electrodes 34 are placed like a matrix and corresponding to a pixel electrode placement area), so that it is made possible to form an image over the whole area in the peripheral length direction of the rigid drum 21. Therefore, for example, the maximum size in which an image may be formed does not depend on the peripheral length of the rigid drum 21 and if the rigid drum 21 of a small diameter is used, the applicable maximum size becomes large.

A protective film (not shown) for ensuring mutual insulation properties of the pixel electrodes 34, etc., and protecting the surfaces of the pixel electrodes 34 and peripheral elements is provided on the surface of the matrix panel 30.

The image carrier 20 of the exemplary embodiment is provided with side plates 22 for closing both end faces of the rigid drum 21. The side plate is provided in a part with a notch 22a and through the notch 22a, an extension part 30*a* extending outward from the rigid drum 21 in the matrix panel 30 is bent and housed in the rigid drum 21. The extension part 30*a* is provided with a latent image creation controller 100 corresponding to latent image creation means described later for controlling the data driver 31, the scan driver 32, etc. Further, a slip ring 23 is provided in a shaft center part of the rigid drum 21 in the center of the side plate 22, and the latent image creation controller 100 and the outside are connected through the slip ring 23. Wiring is drawn out from the slip ring 23 outward from the slip ring 23 and signals from the wiring are transmitted to the matrix panel 30 through the slip ring 23.

In such connection, for example, the extension part 30*a* of the matrix panel 30 may be reinforced with a rigid plate, for example, and plurality of spring-like members connected to external terminals of the latent image creation controller 100 may be included in the reinforced part and may be brought into contact with the corresponding parts of the slip ring 23.

The matrix panel 30 of the exemplary embodiment is provided with the data drivers 31 and the scan drivers 32 and further the latent image creation controller 100 is provided in the extension part 30*a*. Wires of the data drivers 31 and the scan drivers 32 connected to the pixel electrodes 34 of the matrix panel 30 are collected to a smaller number of wires for connection to the latent image creation controller 100.

Thus, the number of wires connected to the latent image creation controller 100 through the slip ring 23 is suppressed to some extent, resulting in a small number of wires.

—Rotation Drive System—

The rotation drive system of the image carrier 20 may be any if a drive force is transmitted to the rigid drum 21 through a drive transmission mechanism in response to the drive force from a drive source not shown (for example, drive motor). The drive transmission mechanism is not limited. For example, the end part in the rotation axis direction of the peripheral surface of the rigid drum 21 may be in press-contact with a different rotation roll for rotation or a sleeve of a large diameter may be provided on the side plate 22 so as to cover the slip ring 23 and may be rotated as a rotation axis.

—Peripheral Structure of Pixel Electrodes—

The peripheral structure containing the pixel electrodes 34 of the matrix panel 30 will be discussed.

In the embodiment, the basic configuration of the matrix panel 34 is as shown in FIGS. 4A to 4C. The pixel electrodes 34 provided in pixel units are placed like a matrix, each pixel electrode 34 is configured as an active matrix system, and, for example, a TFT (Thin Film Transistor) 33 is used as a switch (switching element). For the TFT 33, a storage capacity 35 and wires for connecting them, namely, a latent image forming signal line (hereinafter called signal line Ls) and a scan signal line (hereinafter called scan line Lg), etc., are provided and further a signal lead Ld extending in an opposite direction to the scan line Lg is connected from each signal line Ls.

The basic configuration of the TFT 33 is as follows: A channel layer of a-Si (amorphous silicon), for example, is formed through a gate insulating film provided so as to cover a gate G and a source S and a drain D are placed on the channel layer with a predetermined spacing. The gate G of the TFT 33 is connected to the scan line Lg extending along the rotation axis direction of the rigid drum 21 (see FIG. 3), and the source S of the TFT 33 is connected to the signal line Ls extending along the rotation direction of the rigid drum 21. Further, the signal line Ls is provided with the signal lead Ld connected to the signal line Ls and extending in a direction crossing the signal line Ls.

The pixel electrode 34 and the storage capacity 35 are connected in parallel to the drain D of the TFT 33, and one parts of the storage capacity are collected in the scan line Lg units and are connected to different scan line Lg or a predetermined potential.

Figure 5:
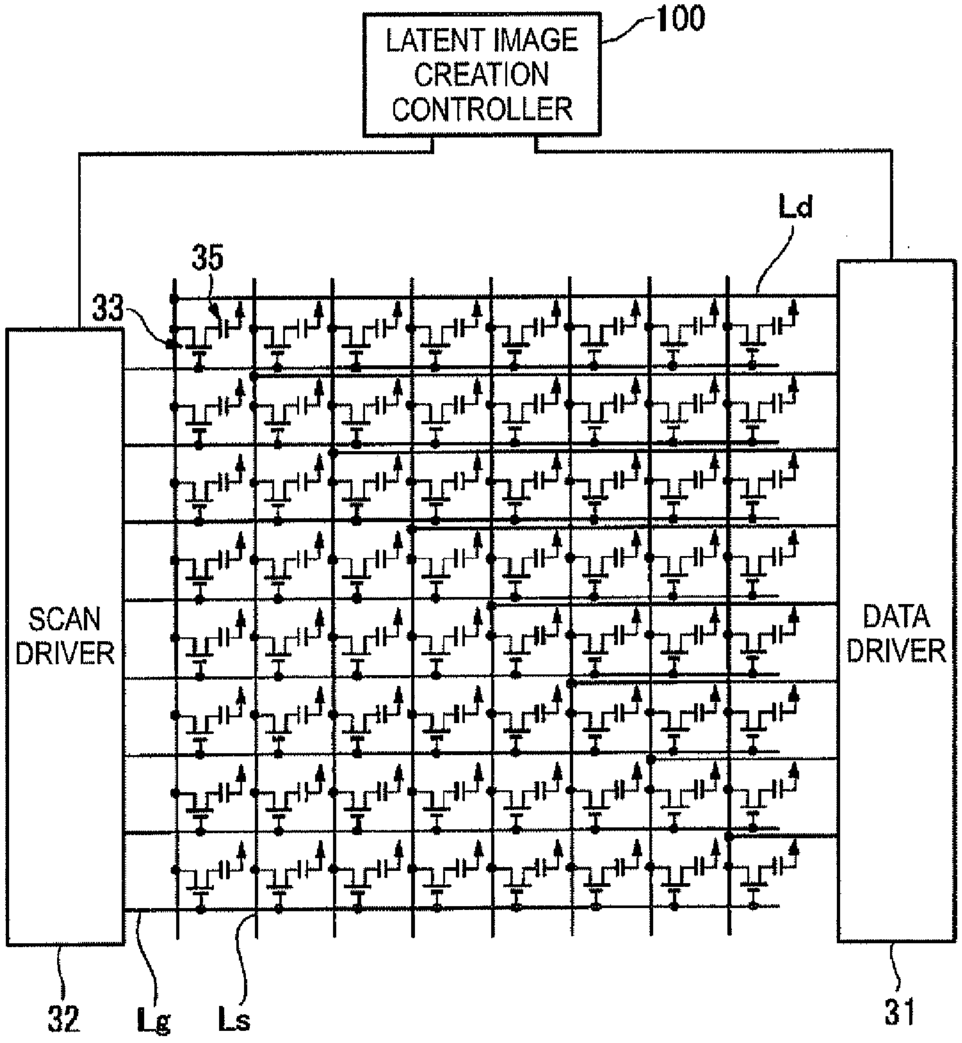
FIG. 5 is a schematic representation to show the wiring configuration of a matrix panel used in exemplary embodiment 1.

The matrix panel 30 of the exemplary embodiment has a large number of pixel electrodes arranged like a matrix and thus a drive system of the matrix panel 30 is as follows:

As shown in FIG. 5, a predetermined number of pixels are collected for each data line and for each scan line and the signal line Ls to which the source S of the TFT 33 is connected for each data line is connected to the data driver 31 through the signal lead Ld connected to the signal line Ls. On the other hand, the scan line Lg to which the gate G of the TFT 33 is connected for each scan line is connected to the scan driver 32. The data driver 31 and the scan driver 32 are controlled by the latent image creation controller 100 (described later in detail). Thus, the data driver 31 and the scan driver 32 are driven at predetermined timing, whereby any desired latent image forming signal is applied to any desired pixel electrode 34.

Further, in the embodiment, an electrode on a different side from the TFT 33 of the storage capacity 35 is connected for each predetermined scan line Lg. In the example, the storage capacities 35 are connected to the scan line Lg, but may be collectively grounded, for example, for each scan line or may be connected to a different reference voltage.

The data driver 31 is made up of a shift register with sample and hold, a latch, a buffer, etc., for example. The scan driver 32 is made up of a counter, a latch, a buffer, etc., for example. Although the pixel electrode 34 is not shown in FIG. 5, the pixel electrode 34 is connected between the drain D of the TFT 33 and the storage capacity 35, needless to say.

—Terminal Connection System—

Next, a terminal connection system of the data driver 31 and the scan driver 32 in the matrix panel 30 will be discussed.

Figure 6:
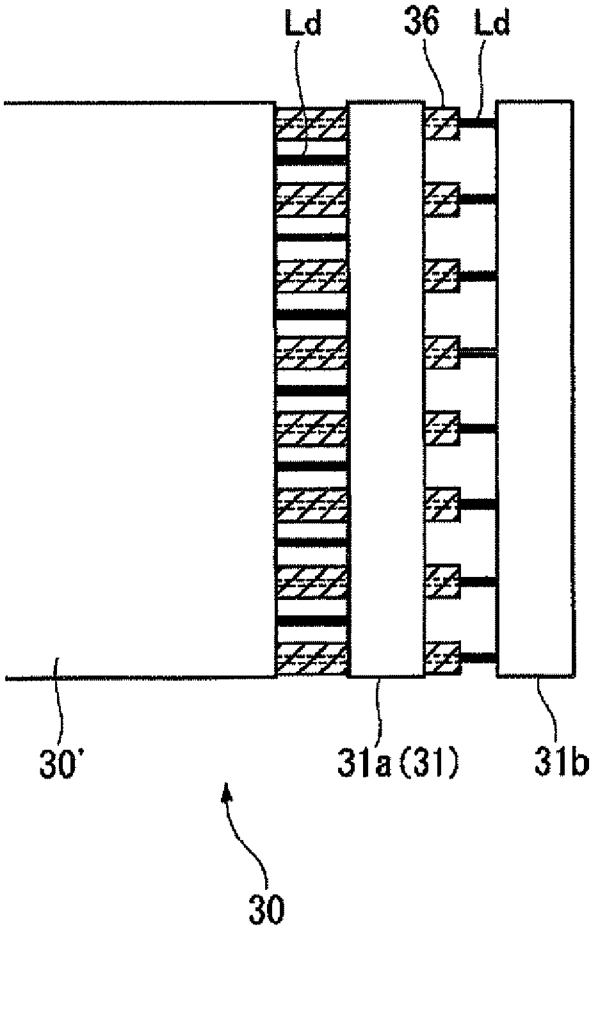
FIG. 6 is a schematic drawing to show the connection configuration of signal leads and data drivers.

FIG. 6 is a schematic representation to show the configuration of connecting the signal leads Ld of the matrix panel 30 to two data drivers 31*a* and 31*b* as the data drivers 31.

The signal leads Ld extend from a matrix electrode section 30' (corresponding to the pixel electrode placement area) of the matrix panel 30 toward an end part in the rotation axis direction on the rigid drum 21, and the adjacent signal leads Ld are connected to the different data drivers 31*a* and 31*b*. Thus, in the portion of the data driver 31*a* near to (inside) the matrix electrode section 30', insulating coat layers 36 are formed corresponding to the signal leads Ld extending to the data driver 31*b* distant from (outside) the matrix electrode section 30' and prevent contact between the signal leads Ld and the data driver 31*a*.

Thus, to connect the signal leads Ld and the data driver 31*a*, a system wherein connection points to the signal leads Ld are provided at different positions relative to the rotation axis direction of the rigid drum 21 so that they do not become the same position relative to the rotation axis direction and the rotation direction of the rigid drum 21 (zigzag placement) is adopted, whereby the spacing between the signal leads Ld connected to one data driver 31 widens and implementation of the data driver 31 is facilitated. Such zigzag placement is adopted, whereby if the signal leads Ld are connected to one data driver 31, for example, it is made possible to ensure sufficient spacing between connection parts and implementation of the data driver 31 is facilitated. Further, similar zigzag placement may also be adopted on the scan line Lg side. As the connection points of the zigzag placement, the number of separation positions in the rotation axis direction of the rigid drum 21 is not limited to two and a larger number of separation positions may be provided.

A known system is adopted for the connection system of the data driver 31 to the signal leads Ld; for example, a module of a form of TAB (Tape Automated Bonding) or TCP (Tape Carrier Package) may be implemented matching connection points. To realize connection at a high density, connection points of TAB or TCP and the connection points of the signal leads Ld may be soldered for connection or, for example, an anisotropic conductive film (ACF) may be interposed between the connection points of the signal leads Ld and the connection point of the data driver 31 and may be heated and pressed, thereby conducting in the thickness direction only of ACF. Any other known system may be adopted.

Such a connection system may be applied to the scan driver, needless to say. As the connection system, adopting of TAB or TCP easily removed may be used if the repair property of the data driver 31, etc., for example, is considered.

—Latent Image Creation Control System—

Figure 7:
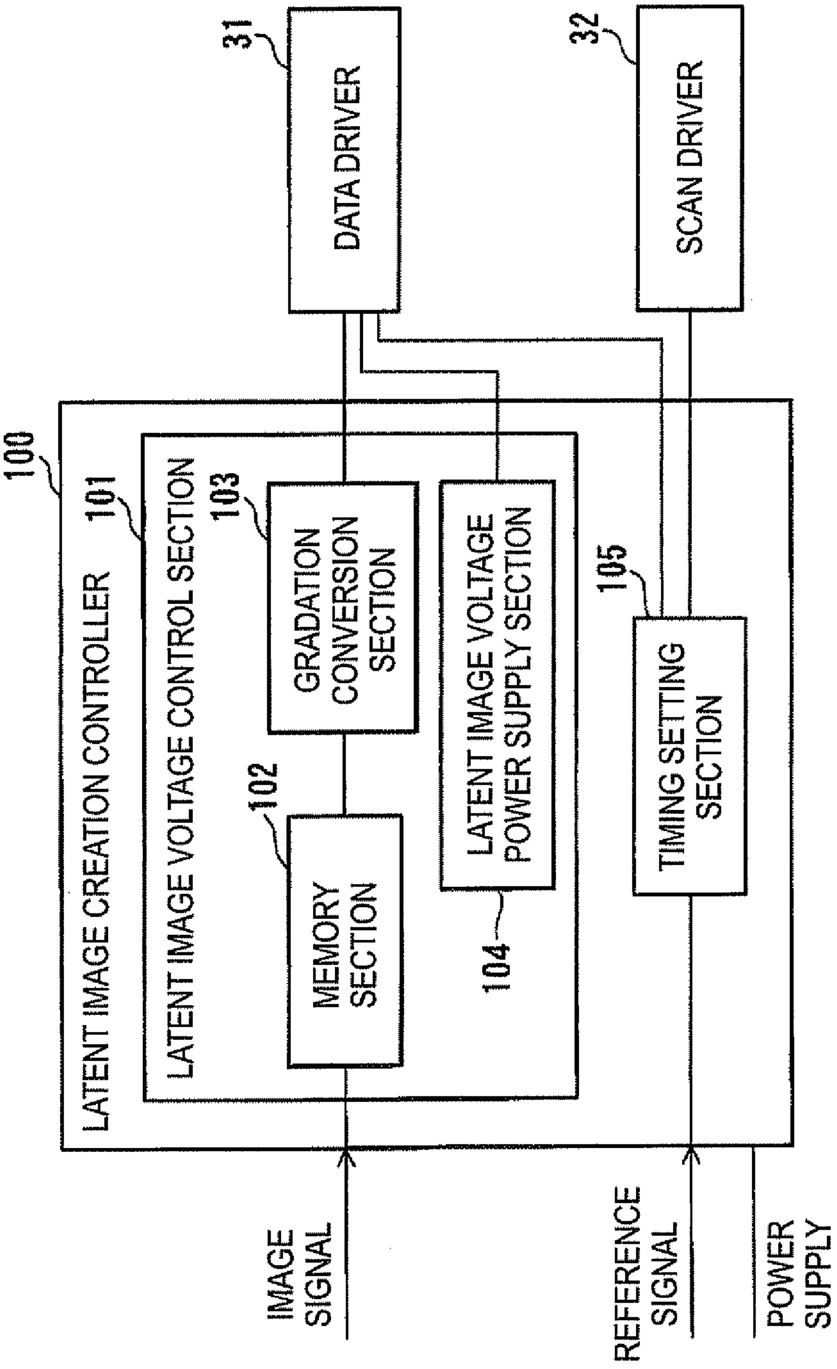
FIG. 7 is a schematic representation to show an example of a latent image creation controller used in exemplary embodiment 1 of the invention.

In the embodiment, as shown in FIG. 7, the latent image creation controller 100 includes a latent image voltage control section 101 which inputs an image signal on which a latent image in the pixel electrodes 34 is based, a reference signal for determining the start timing of latent image forming, etc., for the image carrier 20, a power supply, etc., and controls so as to determine a latent image forming signal (specifically, latent image voltage) to the corresponding pixel electrode 34 based on the image signal and a timing setting section 105 for setting various timings based on the reference signal, and sends a predetermined control signal to the data driver 31 and the scan driver 32.

The latent image voltage control section 101 includes a memory section 102 for storing image data from the image signal, a gradation conversion section 103 for executing gradation conversion of the image data from the memory section 102, and a latent image voltage power supply section 104 for supplying various latent image voltages distributed to the corresponding pixel electrodes 34 based on information subjected to the gradation conversion in the gradation conversion section 103.

Latent image forming signals from the latent image voltage control section 101 and the timing setting section 105 are transmitted to the data driver 31 and on the other hand, a scan signal from the timing setting section 105 is transmitted to the scan driver 32, whereby the latent image voltage based on the image signal is transmitted using each data line to the pixel electrodes 34 arranged in the scan line selected and scanned at a predetermined timing.

<Developing Device>

—Configuration Example of Developing Device—

Figure 8:
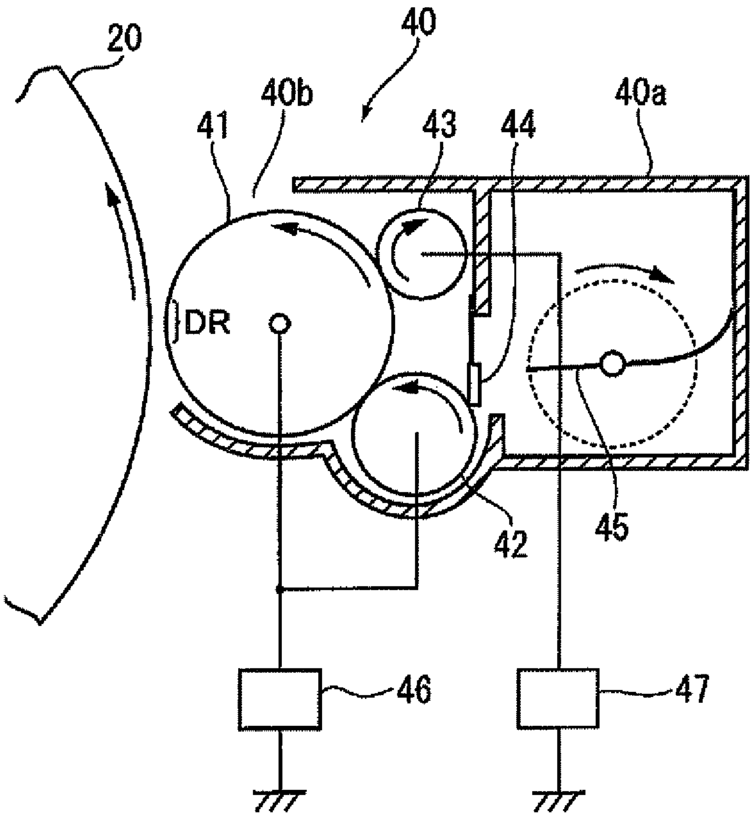
FIG. 8 is a schematic representation to show an example of a developing device used in exemplary embodiment 1 of the invention.

As shown in FIG. 8, the developing device 40 in the exemplary embodiment has a developer vessel 40*a* for storing conductive toner (hereinafter abbreviated as toner as required), the developer vessel 40*a* is provided with a developing opening 40*b* opposed to the image carrier 20, and the developing device 40 is provided with the developing roll 41 facing the developing opening 40*b*, placed at a distance from the image carrier 20 and rotating at different position at an opposed position, and develops the latent image formed on the image carrier 20 to form a visible image in a developing area where developing may be performed in toner in an opposed part of the image carrier 20 and the developing roll 41.

In the developer vessel 40*a*, a supply roll 42 for supplying toner to the developing roll 41 is included at a position opposed to the developing roll 41 and a charge injection roll 43 for injecting a charge into the toner on the developing roll 41 is included downstream in the rotation direction of the developing roll 41 from the supply roll 42. Further, the supply roll 42 is provided with a layer regulation blade 44 for regulating the layer thickness of the toner on the supply roll 42, and the layer thickness of the toner on the supply roll 42 is made roughly uniform. Further, an agitator 45 for supplying toner to the supply roll 42 while agitating the toner is provided at the back of the supply roll 42.

While a developing bias from a bias power supply 46 is applied to the developing roll 41, the bias power supply 46 is also supplied to the supply roll 42, and the supply roll 42 and the developing roll 41 are at the same potential. A bias power supply 47 is connected to the charge injection roll 43 and a charge injection bias larger than the developing bias is applied to the charge injection roll 43. Therefore, a developing electric field acts between the image carrier 20 and the developing roll 41, and a charge injection electric field acts between the developing roll 41 and the charge injection roll 43.

In the embodiment, the developing roll 41 is formed of an aluminum roll with a surface anodized. The charge injection roll 43 is formed of aluminum roll formed with a small uniform tongued and grooved face on a surface by a sand blast method, a chemical etching method, etc. The developing roll 41 and the charge injection roll 43 are supported with slight contact or a minute gap. Further, the layer regulation blade 44 is provided by fixing silicone rubber or EPDM rubber to a stainless steel plate spring having a thickness of about 0.03 to 0.3 mm, for example, with an adhesive, etc., and has one end brought into light contact with the surface of the supply roll 42 and an opposite end supported in a part of the developer vessel 40*a*.

—Configuration Example of Conductive Toner—

Figure 9A:
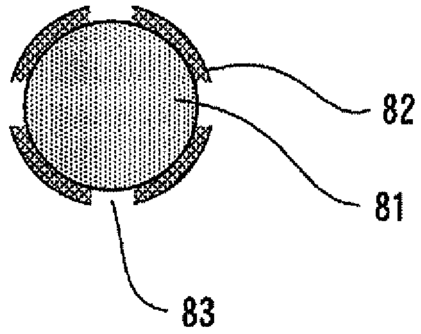
FIGS. 9A and 9B are schematic representations to show an example of conductive toner used in the developing device shown in FIG. 8.

The conductive toner used in the exemplary embodiment has a conductive toner base body (conductive core) 81 made of a material having conductivity, the surrounding of the conductive core 81 is coated with an insulative coat layer (for example, insulative resin layer) 82, and the insulative coat layer 82 is provided with an appropriate number of concave parts 83 so that parts of the conductive core 81 are exposed, for example, as shown in FIG. 9A. The conductive toner may be manufactured according to a polymerization method, various known capsulation techniques, etc. At this time, the conductive core 81 is manufactured by dispersing conductive carbon or a conductive agent of transparent conductive powder, etc., of ITO, etc., in polyester-based resin, styrene acrylic resin or coating particle surfaces of polyester-based resin, styrene acrylic resin with the conductive agent.

The conductive toner of such a form shows tendency of lower resistance if a high electric field is applied. The magnitude of the electric field for lower resistance depends on the occupation percentage of the concave parts 83 of the toner or the thickness of the insulative coat layer 82, etc. The mechanism is estimated as follows: Since the conductive core 81 is coated with the insulative coat layer 82, the conductive core 81 scarcely comes in contact with another core or comes in direct contact with an electrode member, etc., a given minute gap is kept through the insulative coat layer 82 and consequently, for example, when a high electric field is applied, conduction occurs because of tunnel effect, etc.

Figure 9B:
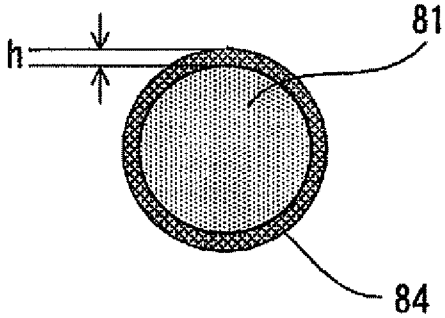

As another form of the conductive toner, the conductive core 81 is coated with an insulative or semiconductive coat layer 84 and a thickness h of the coat layer 84 is adjusted appropriately, whereby resistance of the toner may be adjusted, for example, as shown in FIG. 9B. For the semiconductive coat layer 84, a semiconductive material may be used or, for example, semiconductive resin provided by containing a minute amount of metal oxide of titanium oxide, tin oxide, etc., or conductive carbon in insulative resin may be used. As the conductive core 81, for example, a form wherein conductive fine particles are deposited near the outer surface of an insulative toner base body (insulative core) of ordinary conductive toner, a form wherein conductive fine particles are mixed into an insulative core, etc., may be selected as required.

<Operation of Image Forming Apparatus>

Next, the whole operation of the image forming apparatus according to the exemplary embodiment will be discussed.

First, using the latent image creation controller 100, a latent image forming signal based on an image signal of each color is applied to each pixel electrode 34 of the image carrier 20 of each color to form an electrostatic latent image.

Next, as shown in FIG. 2, the developing device 40 develops a latent image of each color formed on each image carrier 20 in each color toner to form a visible image and each transfer device 63 primarily transfers each color toner image onto the intermediate transfer belt 50. Then, the secondary transfer device 60 secondarily transfers each color toner image on the intermediate transfer belt 50 onto a record material and then the record material where each color toner image is fixed by the fixing device 76 is discharged. The toner remaining on each image carrier 20 is cleaned by the cleaner 62.

—Latent Image Forming—

Latent image forming in the pixel electrodes 34 in the image carrier 20 will be discussed in detail with FIGS. 4 and 5.

When an ON voltage is applied to the gate G of the TFT 33 connecting to the scan line Lg selected by the scan driver 32, a conduction state is placed between the source S and the drain D of the TFT 33. At this time, the data driver 31 supplies a latent image forming signal based on an image signal to each signal line Ls and the source S of the TFT 33 of each pixel through the signal lead Ld and the TFT 33 turned ON charges the storage capacity 35 until the storage capacity 35 becomes equivalent to the source voltage. The potential of the pixel electrode (corresponding to a latent image potential) is determined by the charge in the storage capacity 35. Then, if an OFF voltage is applied to the gate G and the source S and the drain D placed in the conduction state are shut off, the charge charged by a capacity component of the storage capacity 35 is held as it is, so that if the source voltage later changes, the latent image potential of the pixel electrode 34 where the latent image is once formed is held as it is.

Such operation is performed over the whole matrix panel 30, whereby an electrostatic latent image in the matrix panel 30 is formed.

—Operation of Developing Device—

Next, the operation of the developing device 40 will be discussed based on FIG. 8. In the developer vessel 40*a*, conductive toner is agitated by the agitator 45 and the agitated toner is supplied to the supply roll 42. The toner supplied to the supply roll 42 passes through a nip between the supply roll 42 and the layer regulation blade 44, whereby a uniform toner layer is formed on the surface of the supply roll 42. The toner layer is conveyed to an opposed part to the developing roll 41 by rotation of the supply roll 42 and is supplied onto the developing roll 41 and is held thereon. A charge is injected into the toner held on the developing roll 41 in a part opposed to the charge injection roll 43 by a charge injection electric field formed between the developing roll 41 and the charge injection roll 43. The toner into which the charge is injected is held and conveyed to the developing roll 41 and is supplied to a developing area DR.

The toner supplied to the developing area DR is guided to the image carrier 20 by the latent image potential held by the pixel electrodes 34 of the image carrier 20 and the latent image formed by the pixel electrodes 34 is visualized in the toner.

In the embodiment, the scan lines Lg and the signal leads Ld connecting to the signal lines Ls are extended in the rotation axis direction and the data drivers 31 and the scan drivers 32 connected to the lines are provided separately in both the end parts in the rotation axis direction on the image carrier 20, whereby it becomes unnecessary to place the data drivers 31 in the peripheral length direction of the image carrier 20 and it is made possible to easily form an image in the whole area in the peripheral length direction of the image carrier 20. Thus, it is made possible to form an image of a size exceeding the peripheral length and the miniaturized image carrier 20 is realized.

In the embodiment, the scan line Lg is adopted as one electrode of the storage capacity 35, but the exemplary embodiment is not limited to the mode. For example, the electrode of the storage capacity 35 may be provided aside from the scan line Lg and may be connected to a reference voltage. As the image forming apparatus, a four-color apparatus is shown, but the image forming apparatus may be a single-color image forming apparatus, needless to say.

In the embodiment, as the matrix panel 30 of the image carrier 20, a part has the extension part 30*a* and is bent to the inner side of the rigid drum 21 and is housed therein (see FIG. 3), but the extension part 30*a* may be separated.

Figure 10A:
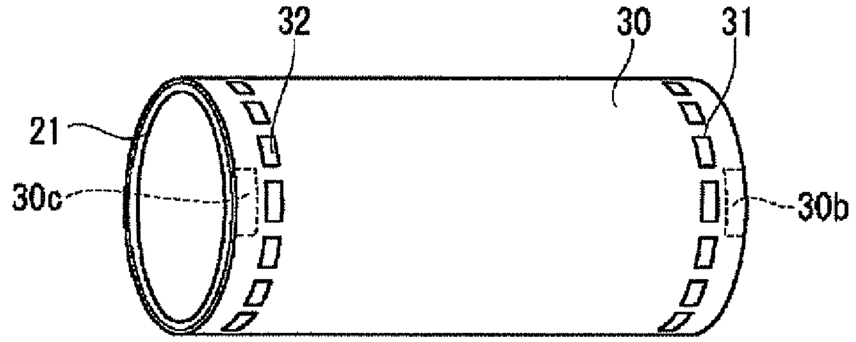
FIGS. 10A to 10C are schematic representations to show the configuration of a separation-type matrix panel.
Figure 10B:
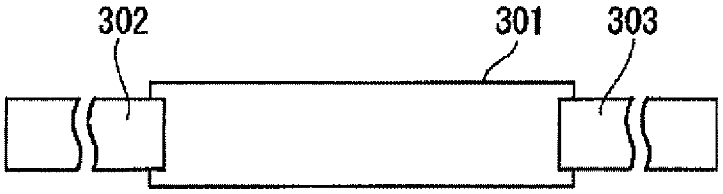
Figure 10C:
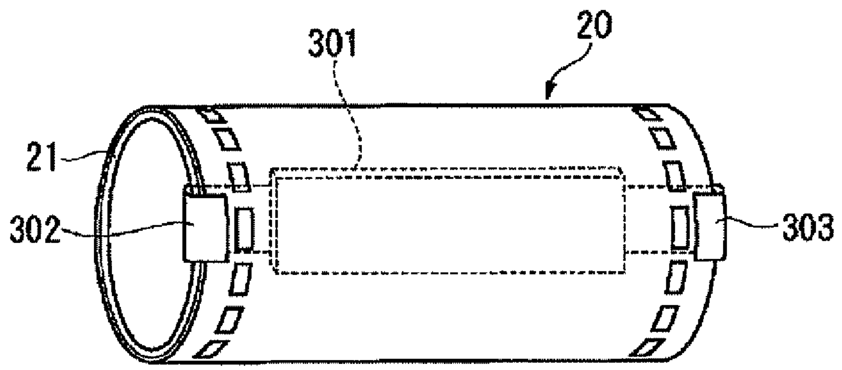

FIGS. 10A to 10C describe the separation-type configuration. FIG. 10A shows the matrix panel 30 fixed to the rigid drum 21; connection terminal groups 30*b* and 30*c* connecting to the data drivers 31 and the scan drivers 32 are provided outside the drivers in both end parts of the matrix panel 30.

In FIG. 10B, connection wiring members 302 and 303 of flexible boards, etc., are connected to two places on both end sides of a rigid plate 301 where the latent image creation controller 100 (not shown) is installed according to a known method of soldering, etc.

In FIG. 10C, FIG. 10A and FIG. 10B are combined; the rigid plate 301 is attached to the inside of the rigid drum 21 and then the connection wiring members 302 and 303 are connected to the connection terminal groups 30*b* and 30*c*. In this case, as a connection method, for example, an anisotropic conductive film (ACF) may be interposed between the connection terminal group 30*b*, 30*c* and the connection wiring member 302, 303 and may be heated and pressed. If necessary, reinforcement may be performed with an adhesive, etc., from above. As the connection method, any other known method may be applied.

Further, in the embodiment, as shown in FIG. 3, the data drivers 31 and the scan drivers 32 are placed separately in both end parts in the rotation axis direction on the image carrier 20, but the exemplary embodiment is not limited to the configuration. For example, wiring may be extended to the extension part 30*a* of the matrix panel 30 and the data drivers 31 and the scan drivers 32 may be placed. In this case, in the vicinities of both end parts on the image carrier 20, the spacing between the scan line Lg and the signal lead Ld (not shown) may be narrowed and may be guided to the extension part 30*a*.

Embodiment 2

Figure 11:
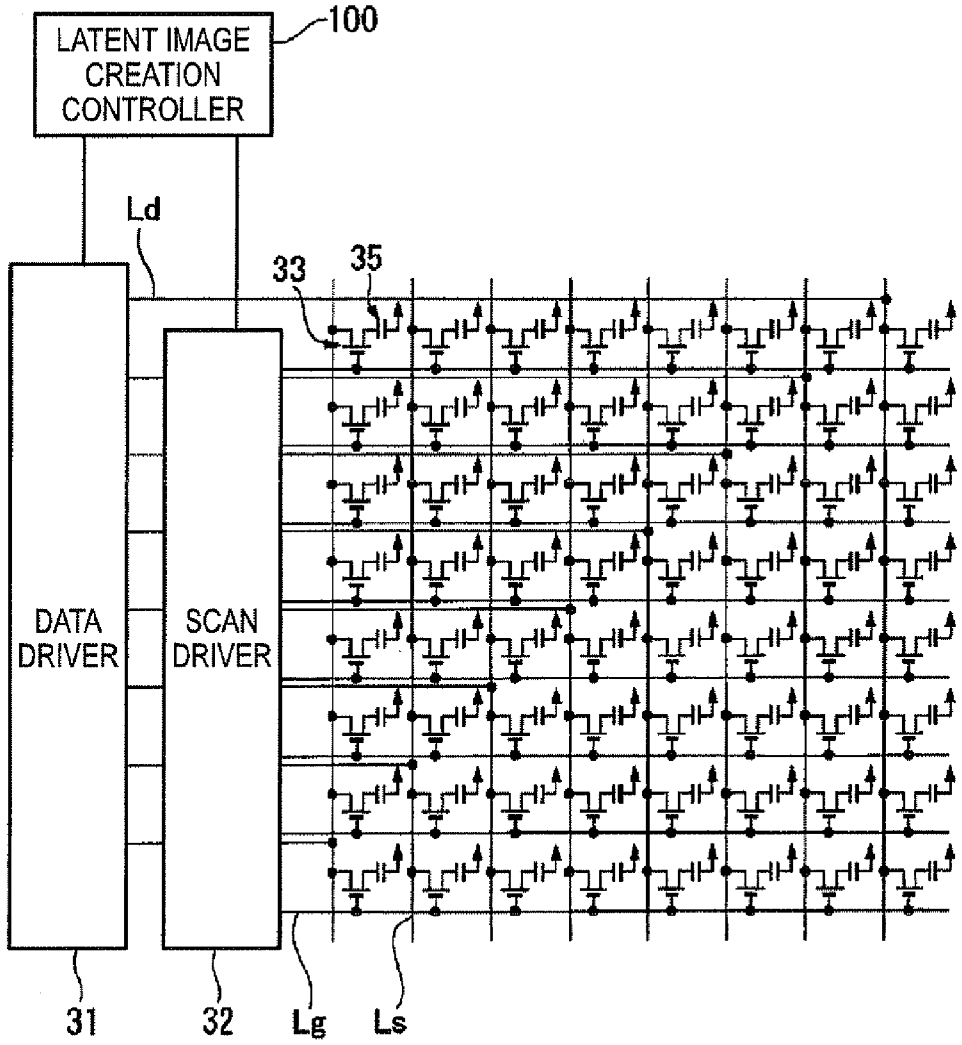
FIG. 11 is a schematic representation to show the wiring configuration of a matrix panel used in exemplary embodiment 2 of the invention.

FIG. 11 is a schematic representation to show a drive system of pixel electrodes 34 of a matrix panel 30 in an image carrier 20 of exemplary embodiment 2.

In the embodiment, unlike exemplary embodiment 1 (for example, see FIG. 5), the extension direction of signal leads Ld connected to signal lines Ls is on the same side as a scan driver 32. A data driver 31 is provided outside the scan driver 32, so that insulating properties are ensured in a portion where the signal leads Ld straddle the scan driver 32.

Figure 12:
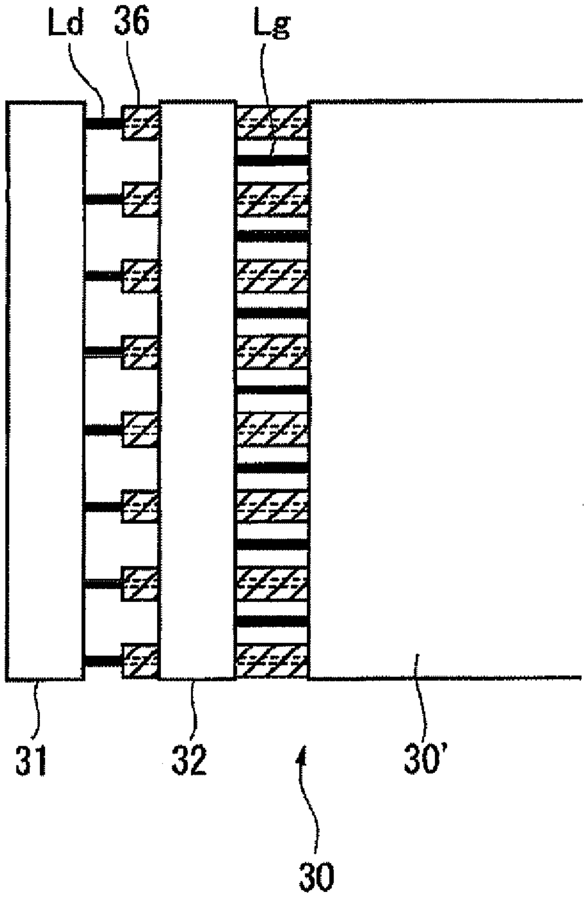
FIG. 12 is a schematic representation to show the connection configuration of signal leads and a data driver and the connection configuration of scan lines and a scan driver in exemplary embodiment 2 of the invention.

FIG. 12 is a schematic drawing to show a termination connection system in the embodiment.

In exemplary embodiment 1, as shown in FIG. 6, the data drivers 31 and the scan drivers 32 are provided separately in both end parts in the rotation axis direction on the image carrier 20; while, in exemplary embodiment 2, the data driver 31 and the scan driver 32 are provided in one end part in the rotation axis direction on the image carrier 20.

Thus, scan lines Lg and the signal leads Ld are extended to the same side and in a portion where the scan lines Lg and the signal leads Ld are placed alternately, they are connected at different positions relative to the rotation axis direction of a rigid drum 21 so that the scan line Lg and the signal lead Ld adjacent to each other do not become the same position relative to the rotation axis direction and the rotation direction of the rigid drum 21 (zigzag placement). An insulation coat layer 36 to ensure insulating properties is formed in a portion where the signal lead Ld straddles the scan driver 32.

Connection of the signal leads Ld and the data driver 31 and connection of the scan lines Lg and the scan driver 32 are similar to those of exemplary embodiment 1 and will not be discussed again.

In exemplary embodiment 2, the signal leads Ld connected to the data driver 31 and the scan lines Lg connected to the scan driver 32 are placed zigzag, so that the data driver 31 and the scan driver 32 may be placed in the same direction and connection of the data driver 31 and the scan driver 32 and a latent image creation controller 100 is facilitated.

In the embodiment, as shown in FIG. 12, the scan line Lg is placed between the signal leads Ld and the number of signal leads Ld (corresponding to the number of signal lines) and the number of scan lines Lg are roughly the same. However, in the actual matrix panel 30, it is assumed that the numbers largely differ.

In such a case, for example, if the driver to which a larger number of lines are connected is placed inside and the driver to which a smaller number of lines are connected is placed outside, it is made possible to apply zigzag placement similar to that in FIG. 12 and implementation of the drivers is facilitated. The driver to which a larger number of lines are connected may be placed outside and the driver to which a smaller number of lines are connected may be placed inside.

Embodiment 3

Figure 13A:
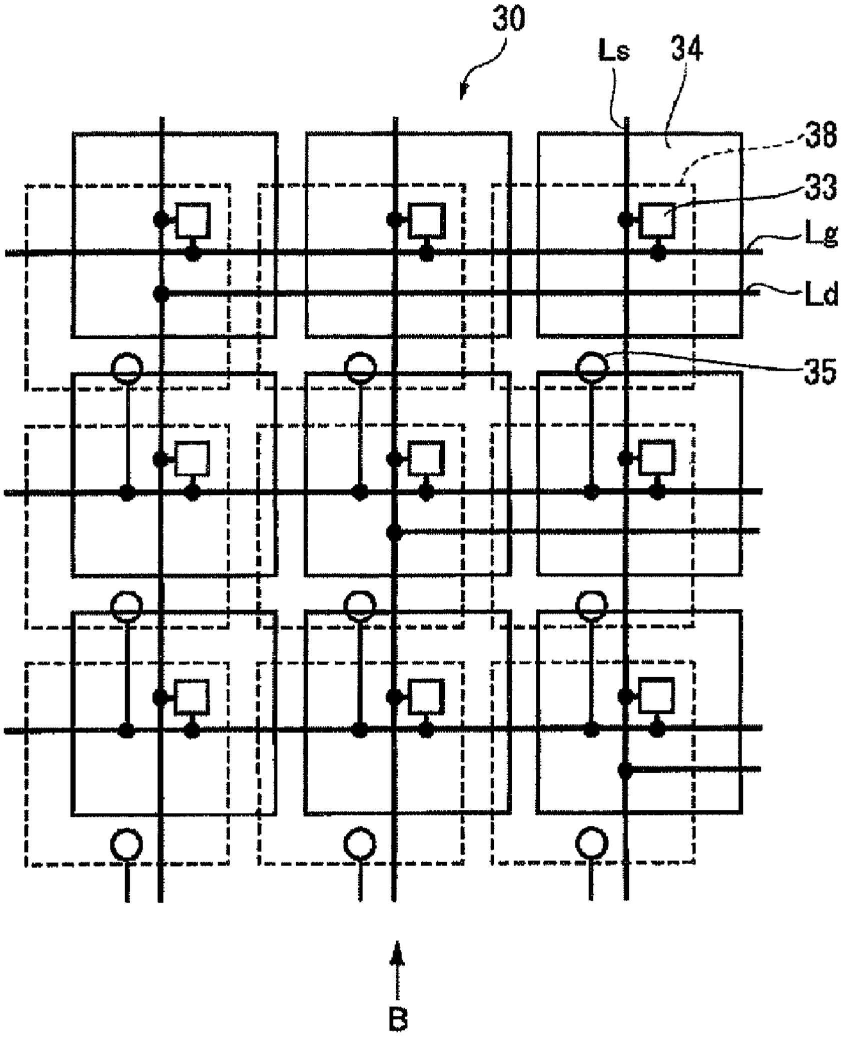
FIG. 13A is a schematic representation of the configuration of a matrix panel used in exemplary embodiment 3 and FIG. 13B is a sectional view from arrow B direction.
Figure 13B:
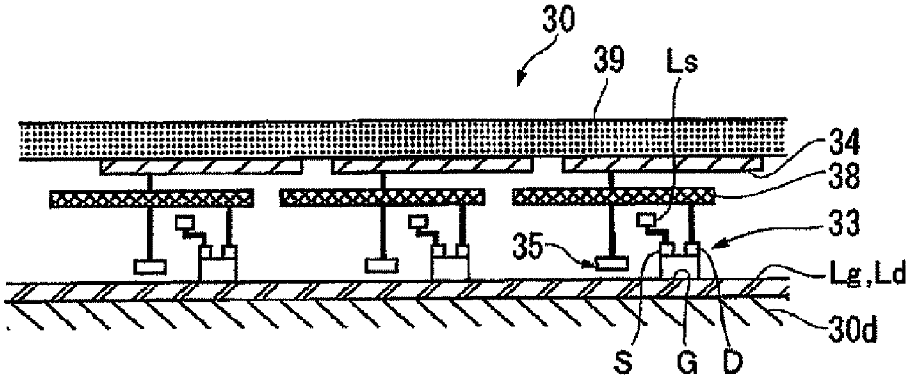

Embodiment 3 has a matrix panel 30 different from that of exemplary embodiment 1 and the configuration of each pixel differs from that of exemplary embodiment 1 (see FIGS. 4A to 4C). Each pixel in the exemplary embodiment is configured as shown in FIGS. 13A and 13B. FIG. 13A shows a cross section viewing FIG. 13B from arrow B direction.

In the figure, the matrix panel 30 has various elements on a film base material 30*d*, and a shield electrode 38 as a shield member made of a conductive film of a size close to a pixel electrode 34 is provided for each pixel electrode 34 aside from the pixel electrodes 34.

Specifically, first, scan lines Lg and signal leads Ld are formed in determined areas on the film base material 30*d* and then each TFT 33 is formed in a part of the scan line Lg so that the scan line Lg side becomes a gate G. A storage capacity 35 is formed with the adjacent scan line Lg as one electrode. Further, a signal line Ls is provided through a conductor from the source S side of the TFT 33. On the other hand, the shield electrode 38 corresponding to each pixel electrode 34 is provided through a conductor from the drain D side of the TFT 33 and the pixel electrode 34 connecting through conductor to the shield electrode 38 is provided on the surface of the shield electrode 38. At this time, from the shield electrode 38, an electrode different from the scan line Lg side of the storage capacity 35 is connected by conductor. Then, a protective film 39 is provided on the surface of the pixel electrode 34.

In the configuration, the shield electrode 38 is formed at a deeper position than the pixel electrode 34 (film base material 30*d* side) and is placed at a slant shift position from the corresponding pixel electrode 34 toward the adjacent pixel electrode 34, so that the portion positioned between the adjacent pixel electrodes 34 is covered with the shield electrode 38 in the layout of the signal lines Ls.

Further, in the embodiment, the portion positioned between the adjacent pixel electrodes 34 is also covered with the shield electrode 38 for the scan line Lg and the signal lead Ld.

The relationship between a latent image potential formed in the pixel electrode and a developing step in an image forming process will be discussed.

Figure 14A:
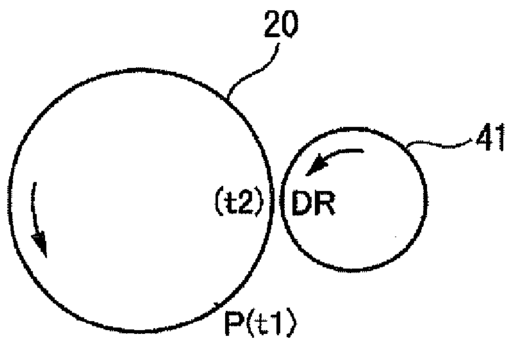
FIGS. 14A and 14B are schematic representations to show the relationship between a latent image forming position and a developing position.
Figure 14B:
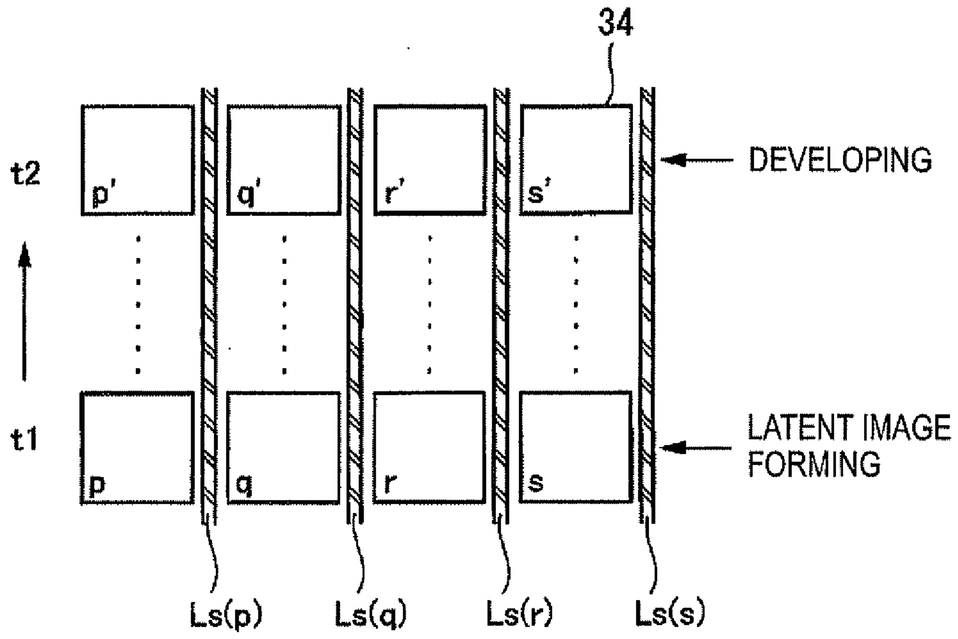

FIGS. 14A and 14B are a drawing to describe the relationship between a latent image forming position and a developing position; it is assumed that the shield electrode 38 as in the exemplary embodiment does not exist and the signal line Ls is placed between the pixel electrodes 34. FIG. 14A shows the positional relationship between an image carrier 20 and a developing roll 41 and FIG. 14B shows motion of the pixel electrodes 34.

Now, assuming that a latent image is formed for four pixel electrodes 34 of p, q, r, and s at a latent image forming position P at time t1, the pixel electrodes 34 where the latent image is formed at the time t1 arrive at a developing area DR by rotation of the image carrier 20 and developing is performed in the developing area DR. However, at the actually developing stage of the pixel electrodes 34 in the developing area DR, a latent image forming signal corresponding to pixel electrodes 34 newly existing at the latent image forming position P is transmitted to the signal lines Ls near to the pixel electrodes 34. That is, assuming that the pixel electrode 34 at the developing time is p', a latent image forming signal to the pixel electrode 34 for p at the latent image forming position P is transmitted to the adjacent signal line Ls (p) at this time. Thus, at the developing time, in addition to the latent image potential forming the latent image at the latent image forming position P at the time t, the effect of the present signal line Ls (p) is also added to the pixel electrode 34 and the effect on the image density and the image quality occurs. Likewise, the effects from signal lines Ls (q), Ls (r), and Ls (s) are also added to the pixel electrodes 34 corresponding to q', r', and s'.

A large effect is produced particularly when the signal line Ls is formed on the same plane as the pixel electrode 34; if the signal line Ls is buried in a deeper part than the pixel electrode 34, the effect may not completely be excluded. If the signal line Ls is formed just below the pixel electrode 34, the effect between the adjacent pixel electrodes (in this case, between the pixel electrodes 34 arranged along the rotation direction of the image carrier 20) may not be excluded.

Figure 15:
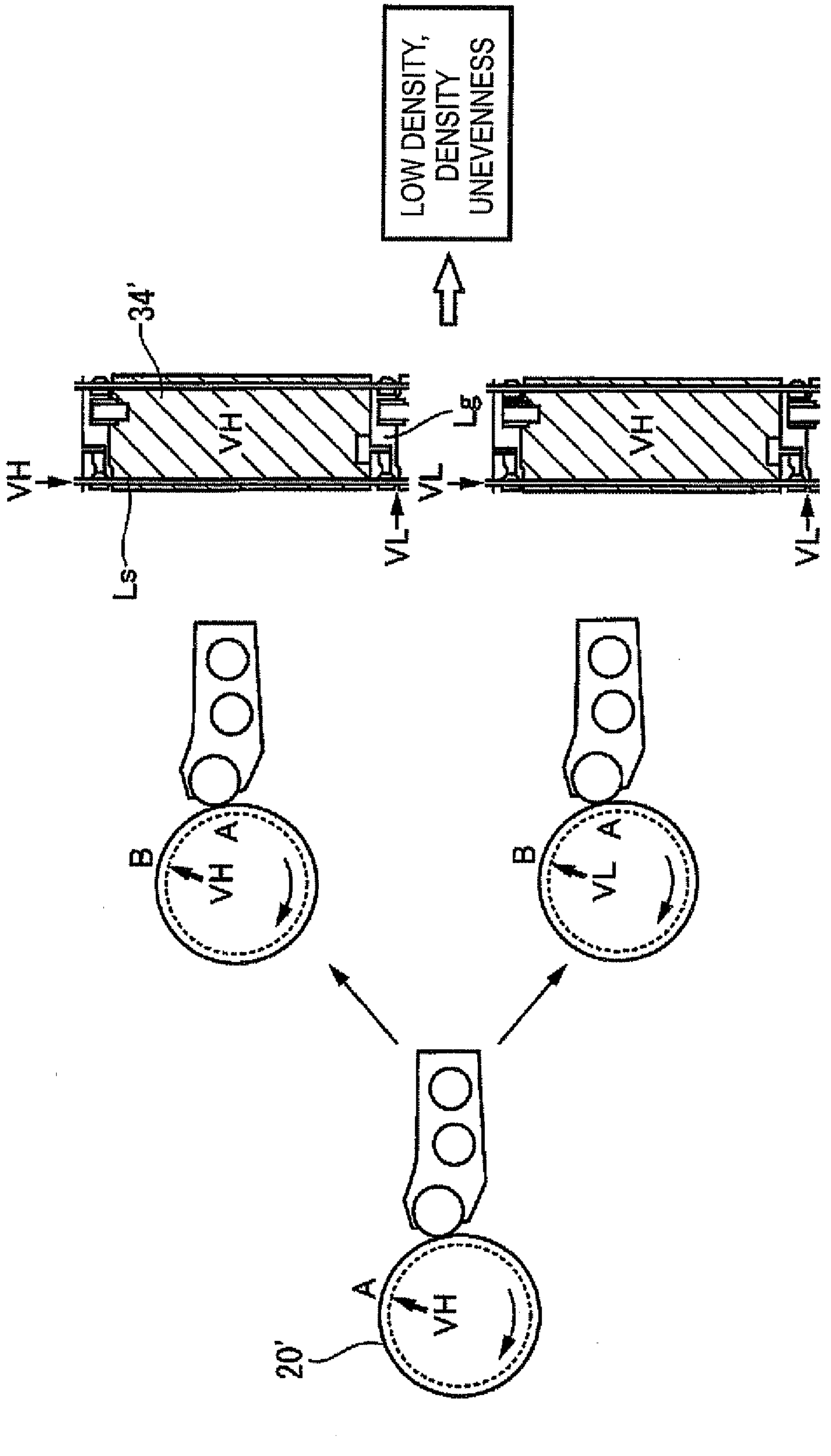
FIG. 15 is a first schematic representation to show the effect from a signal line in a mode in which no shield member is provided for comparison.
Figure 16:
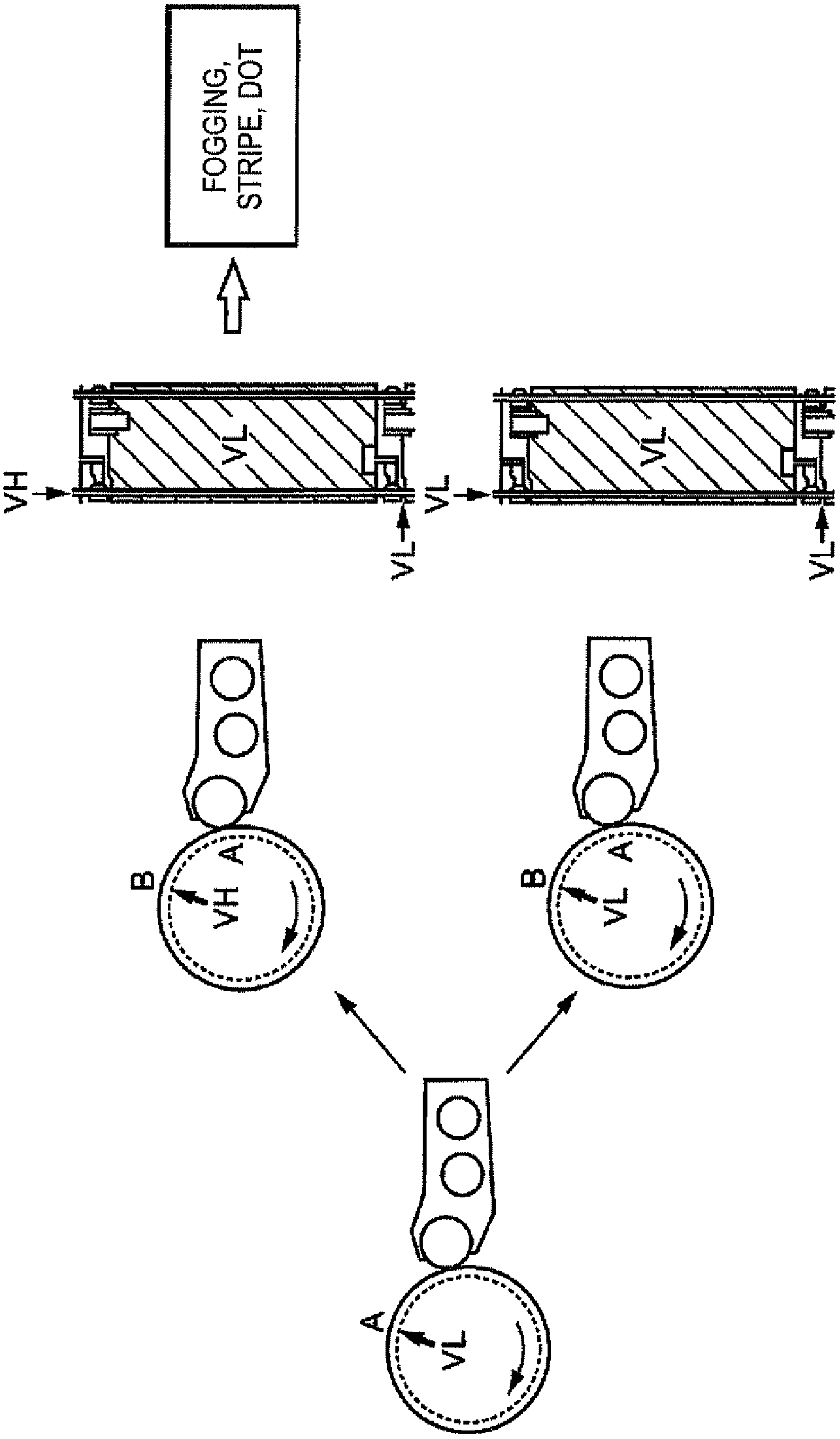
FIG. 16 is a second schematic representation to show the effect from a signal line in a mode in which no shield member is provided for comparison.

FIGS. 15 and 16 are schematic representations to show how the effect from the signal line Ls at the developing time is produced when no shield electrode is provided for comparison. Here, an example wherein negative charge toner is used and an image signal is binarized is shown; if a high voltage (VH) is applied to the pixel electrode 34 or the signal line Ls, toner is sucked and if a low voltage VL is applied, toner is not sucked.

As in FIG. 15, when VH is written into a pixel electrode 34' at an A position of an image carrier 20' and the A position arrives at a developing position, if VH or VL is applied to the signal line Ls at a B position, electric field action from the signal line Ls affects the pixel electrode 34' at the developing time and a portion in the proximity of the signal line Ls becomes a high density or a low density, resulting in a low density or density unevenness.

On the other hand, as in FIG. 16, when VL is applied to the pixel electrode 34' at the A position of the image carrier 20' and the A position arrives at the developing position, if VH or VL is applied to the signal line Ls at the B position, when VL is applied, no effect is produced; when VH is applied, image degradation of fogging, a stripe, dot-like dirt, etc., occurs in the proximity of the signal line Ls.

To prevent such image degradation, it is necessary to prevent the effect of the electric field action from the signal line Ls at the developing time. This comment also applies to the signal lead Ld connecting to the signal line Ls.

In the embodiment, as shown in FIGS. 13A and 13B, the signal line Ls is buried to the film base material 30*d* rather than the pixel electrode 34 and further the shield electrode 38 is provided so as to cover the signal line Ls positioned between the adjacent pixel electrodes 34 and is connected to the corresponding pixel electrode 34, whereby the effect of the electric field action from the signal line Ls at the developing time is almost excluded and a good image responsive to the latent image potential is obtained.

In the embodiment, the signal lead Ld is buried in a deeper part than the signal line Ls and thus the effect as in the signal line Ls is circumvented and the signal lead Ld is covered with the shield electrode 38.

Further, in the embodiment, the signal line Lg is also covered with the shield electrode 38 and thus if VH is applied to the scan line Lg (corresponding to OFF voltage of the TFT 33), the effect of the electric field action from the scan line Lg is removed. Thus, the effect of the electric field from the signal line Ls, etc., is suppressed and a stable latent image potential in the pixel electrode 34 is maintained.

In the embodiment, the shield electrode 38 is connected to the corresponding pixel electrode 34, but the exemplary embodiment is not limited to the mode. The shield electrode 38 may be connected to a reference voltage. For example, it is connected to VL, whereby occurrence of fogging is furthermore suppressed and density unevenness decreases. However, when the density lowers as a whole, if the latent image potential in the pixel electrode 34 is set to a larger value so as to compensate for lowering the density, a problem does not arise.

Further, in the embodiment, the scan line Lg is adopted as one electrode of the storage capacity 35, but the exemplary embodiment is not limited to the mode. For example, the electrode of the storage capacity 35 may be provided aside from the scan line Lg and may be connected to the reference voltage. As the image forming apparatus, a four-color apparatus is shown, but the image forming apparatus may be a single-color image forming apparatus, needless to say.

In the embodiment, the shield electrode 38 is placed at a deeper position than the pixel electrode 34, but may be provided on the surface side as compared with the pixel electrode 34. However, from the viewpoints of providing a stable image by the pixel electrodes 34 and aiming at higher density, the shield electrode 38 may be placed at a deeper position than the pixel electrode 34.

Fourth Embodiment

Figure 17:
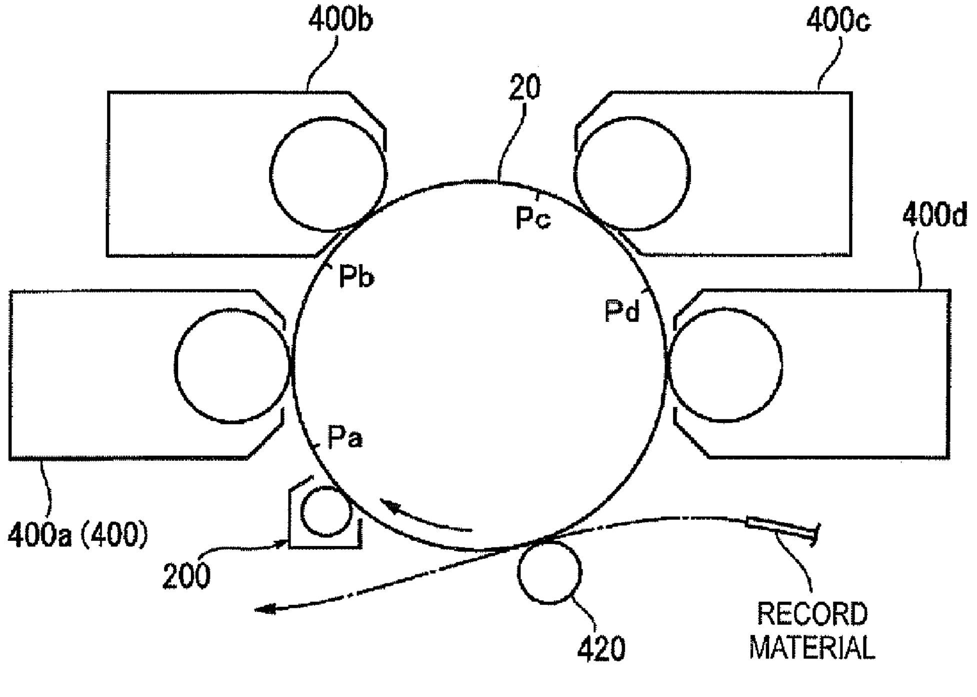
FIG. 17 is a schematic representation to show an outline of an image forming apparatus of exemplary embodiment 4 of the invention.

FIG. 17 shows an outline of an image forming apparatus of exemplary embodiment 4 of the invention. Unlike the image forming apparatus of exemplary embodiment 1 (see FIG. 2), one image carrier 20 is surrounded by plural of (in the embodiment, four) developing devices 400 (400*a* to 400*d*).

The image carrier 20 of the exemplary embodiment is configured roughly like that of exemplary embodiment 1 and is provided with pixel electrodes (not shown) formed like a matrix. The image carrier 20 is surrounded by the developing devices 400 (400*a* to 400*d*) corresponding to colors of yellow, magenta, cyan, and black, for example, and a latent image formed on the image carrier 20 is developed by the developing devices 400 to form a multiplexed toner image. In the surrounding of the image carrier 20, a transfer device 420 for transferring the toner image formed on the image carrier 20 onto a record material is provided between the developing devices 400*d* and 400*a* and further a cleaner 200 is provided between the transfer device 420 and the developing device 400*a*.

As the developing device 400 in the embodiment, the developing device 40 using conductive toner as in exemplary embodiment 1 (for example, see FIG. 8) or a developing device using ordinary frictional electrification type toner may be used.

A latent image forming step and a developing step in the described image forming apparatus will be discussed.

As shown in FIG. 17, assuming that positions indicated by Pa to Pd are latent image forming positions corresponding to the developing devices 400*a* to 400*d* relative to developing areas of the developing devices 400, at the timing at which one scan line arrives at the latent image forming position Pa, an ON voltage is applied to the scan line of the image carrier 20 corresponding to that scan line and TFT is turned on. At the timing, a latent image forming signal responsive to a yellow image signal, for example, corresponding to the developing device 400*a* is supplied to a signal line of each data line, whereby a latent image responsive to the yellow image signal is formed for the pixel electrodes on one scan line.

Next, similar operation is performed for a scan line existing at the latent image forming position Pb and a latent image responsive to a magenta image signal, for example, is formed. Further, similar operation is performed in order at the latent image forming positions Pc and Pd, whereby latent images on cyan and black scan lines, for example, are formed. After such operation is repeated in order, again the position returns to the latent image forming position Pa and similar operation is repeated.

On the other hand, in the developing devices 400, the latent images formed at the latent image forming positions Pa to Pd are developed in toner of each color in developing areas. For the first latent image, a latent image potential which becomes a non-image portion (background portion) may be added to each signal line for each pixel of the scan line corresponding to the latent image forming position Pb until the scan line selected at the latent image forming position Pa, for example, arrives at the position Pb. This is performed in a similar manner at the latent image forming positions Pc and Pd, whereby a multiplexed toner image is formed on the image carrier 20 passing through the last developing device 400*d*. That is, the latent images corresponding to the developing devices 400*a* to 400*d* are formed in order at the latent image forming positions Pa to Pd by time division drive, whereby the color toner images are multiplexed in order on the image carrier 20.

The multiplexed toner image is transferred onto a record material in the transfer device 420.

In such a system, shield electrodes may be provided to suppress the effect of the signal lines at the developing time.

The system wherein the color toner images formed on the image carrier 20 are multiplexed on the image carrier 20 as they are makes it possible to lessen the number of components as compared with a system wherein color toner images are formed on plural of image supports 20 and the toner images transferred from the image supports 20 are multiplexed; consequently that system becomes advantageous for miniaturization and cost reduction of the apparatus.

Modified Embodiment

In a modified embodiment, unlike the embodiments described above, a matrix panel 30 of an image carrier 20 is provided directly on a rigid drum 21.

In the modified embodiment, as the rigid drum 21, insulating treatment is performed for a cylindrical aluminum pipe having a sufficiently polished surface, for example, and then the matrix panel 30 is formed using directly a thin film manufacturing technique, etc.

To form TFT 33, pixel electrodes 34, etc., on the peripheral surface of the base material shaped like a pipe, for example, film forming using a plasma CVD method, sputter method, etc., patterning according to a photo process, and the like are repeated.

Figure 18:
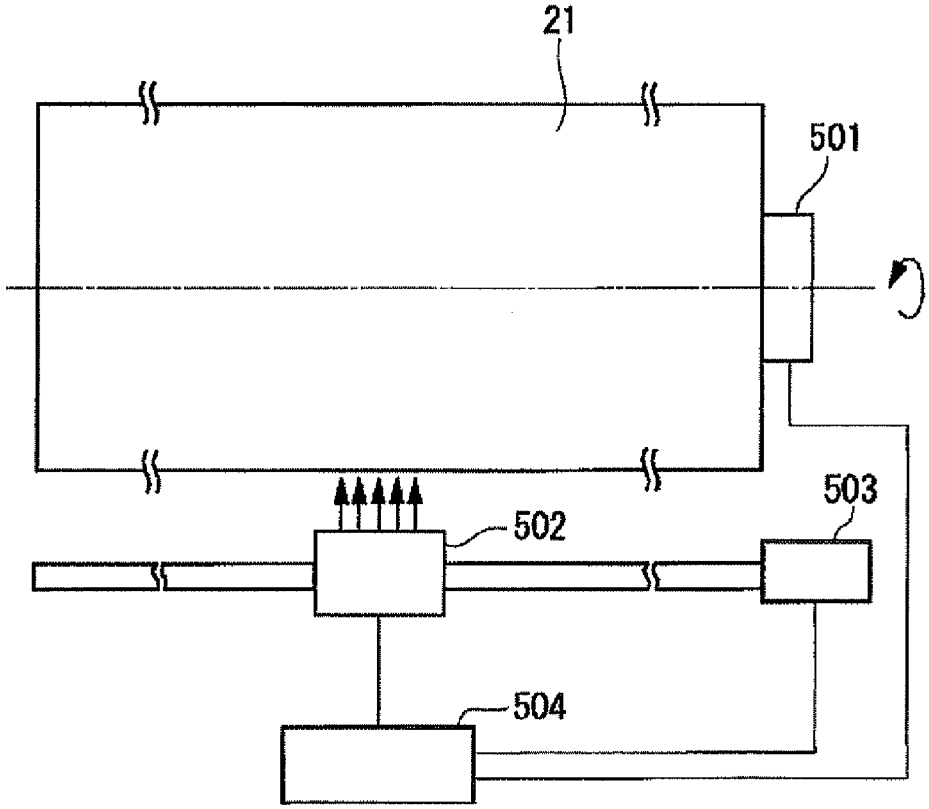
FIG. 18 is a schematic representation to show an outline of a photo process used for an image carrier of a modified embodiment.

FIG. 18 is a schematic drawing to show a representative example of the photo process. A film is formed over the roughly full face of the rigid drum 21 and then a resist film is applied and is dried and then patterning is performed as shown in the figure.

That is, the rigid drum is set in a rotation jig (not shown) and is rotated. At this time, rotation is controlled by a rotary encoder 501 and an exposure optical system 502 of laser light, etc., for example, is scanned while it is controlled in a control circuit 504 using a linear encoder 503 in a rotation axis direction.

Accordingly, any desired patterning is performed on the rigid drum 21, developing is performed, a resist film is left in any desired part, and, for example, chemical etching is performed to remove the resist film.

The steps are repeated, whereby a matrix panel with drivers uninstalled is formed on the rigid drum 21.

After an insulative protective film is applied to the surface, data drivers and scan drivers are installed and terminal connection is performed, whereby the matrix panel is completed on the rigid drum 21.

According to the configuration, the peripheral surface of the rigid drum 21 does not contain an extra portion of cut, etc., and the maximum image to be formed may easily exceed the peripheral length.

The protective film may be applied after the drivers are installed, for example.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image carrier comprising:

a support that circulatively rotates, a plurality of pixel electrodes that are provided on the support and placed like a matrix for each pixel unit along a rotation direction and a rotation axis direction of the support so as to form a latent image based on an image signal, the plurality of pixel electrodes further arranged in a center circumferential area of the support, and arranged with a circumferential area on each side of the center area in which no pixel electrodes are placed, wherein the matrix-like placement of the pixel electrodes uniformly covers the entire center circumferential area;

a plurality of switches that are placed like a matrix on the support in a one-to-one correspondence with the pixel electrodes for switching a supply timing of a latent image forming signal so as to form a latent image based on the image signal for the pixel electrodes;

a plurality of scan signal lines that are provided on the support so as to extend along the rotation axis direction of the support for transmitting a scan signal for selecting and scanning in sequence the supply timing of the latent image forming signal to a group of the plurality of switches corresponding to the pixel electrodes arranged in a row along the rotation axis direction of the support;

a plurality of latent image forming signal lines that are provided on the support so as to extend in the rotation direction of the support for transmitting the latent image forming signal to a group of the plurality of switches corresponding to the pixel electrodes arranged in a row along the rotation direction of the support;

a plurality of signal leads that are provided on the support so as to extend in the rotation axis direction of the support and connected to the latent image forming signal lines for drawing out the latent image forming signal line toward an end part other than a pixel electrode placement area in the rotation axis direction on the support;

a scan signal supply device that are provided in an end part other than the pixel electrode placement area in the rotation axis direction on the support or any other part passing through the end part and connected to the plurality of scan signal lines arranged in the rotation direction of the support for supplying a scan signal to each scan signal line; and a latent image forming signal supply device that are provided in an end part other than the pixel electrode placement area in the rotation axis direction on the support or any other part passing through the end part and connected to the plurality of signal leads arranged in the rotation direction of the support for supplying the latent image forming signal to each signal lead.

2. The image carrier according to claim 1 wherein the scan signal supply device is provided in one end part other than the pixel electrode placement area in the rotation axis direction on the support or any other part passing the end part, and wherein the latent image forming signal supply device is provided in an opposite end part other than the pixel electrode placement area in the rotation axis direction on the support or any other part passing the end part.

3. The image carrier according to claim 2 wherein as for connection points of the plurality of signal leads and the latent image forming signal supply device, a separate connection is made at different positions relative to the rotation axis direction of the support so that at least the adjacent connection points do not become the same position relative to the rotation axis position and the rotation direction of the support.

4. The image carrier according to claim 3 wherein further, as for connection points of the plurality of scan signal lines and the scan signal supply device, a separate connection is made at different positions relative to the rotation axis direction of the support so that at least the adjacent connection points do not become the same position relative to the rotation axis direction and the rotation direction of the support.

5. The image carrier according to claim 1 wherein the scan signal supply device and the latent image forming signal supply device are provided in one end part other than the pixel electrode placement area in the rotation axis direction on the support or any other part passing the end part.

6. The image carrier according to claim 5 wherein the scan signal supply device and the latent image forming signal supply device have an overlap portion in the rotation direction of the support and are provided side by side in the rotation axis direction, and wherein at least one of the scan signal lines and the signal leads stride in an isolation state over the inner provided supply device of the scan signal supply device or the latent image forming signal supply device and are connected to the corresponding outer supply device.

7. The image carrier according to claim 1 further comprising: a shield member for preventing at least a part of an electric field from the latent image forming signal lines and the signal leads placed close to the pixel electrodes from affecting a latent image of the pixel electrodes.

8. The image carrier according to claim 7 wherein the shield member is electrically connected to one pixel electrode nearest thereto.

9. The image carrier according to claim 7 wherein the shield member is placed in a deeper position than a pixel electrode relative to a thickness direction of the pixel electrode on the support.

10. The image carrier according to claim 9 wherein when the pixel electrodes are projected in the thickness direction, the shield member has an overlap portion with some of the pixel electrodes.

11. An image forming apparatus comprising:

an image carrier according to claim 1;

a latent image creation unit that creates the latent image forming signal based on an image signal for the pixel electrodes of the image support; and a developing unit that develops a latent image formed in the pixel electrodes with the latent image forming signal created in the latent image creation means in a developer.

12. The image forming apparatus according to claim 11 wherein the image carrier has a peripheral length less than the maximum size in which an image is formed in a direction along the rotation direction of the image support.

* * * * *